United States Patent
Hayakawa

(10) Patent No.: US 9,407,785 B2
(45) Date of Patent: Aug. 2, 2016

(54) PROCESSING APPARATUS, PROCESSING METHOD AND COMPUTER-READABLE STORAGE MEDIUM

(71) Applicant: CANON KABUSHIKI KAISHA, Tokyo (JP)

(72) Inventor: Mizuki Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/571,794

(22) Filed: Dec. 16, 2014

(65) Prior Publication Data

US 2015/0189114 A1 Jul. 2, 2015

(30) Foreign Application Priority Data

Dec. 27, 2013 (JP) ................... 2013-273173
Dec. 5, 2014 (JP) ................... 2014-247317

(51) Int. Cl.
*H04N 1/00* (2006.01)
*H04N 1/21* (2006.01)

(52) U.S. Cl.
CPC ....... *H04N 1/00915* (2013.01); *H04N 1/00472* (2013.01); *H04N 1/00474* (2013.01); *H04N 1/2104* (2013.01); *H04N 1/2183* (2013.01); *H04N 2201/0094* (2013.01)

(58) Field of Classification Search
CPC .......... H04N 1/00472; H04N 1/00474; H04N 1/00915; H04N 1/2104; H04N 1/2183; H04N 2201/0094
USPC ........................................................ 358/1.13
See application file for complete search history.

(56) References Cited

U.S. PATENT DOCUMENTS

| 8,027,054 B2* | 9/2011 | Kang et al. .......... 358/1.16 |
| 2007/0288704 A1* | 12/2007 | Mizuno ................ 711/154 |
| 2012/0137087 A1* | 5/2012 | Umimura ............. 711/154 |

* cited by examiner

*Primary Examiner* — Iriana Cruz
(74) *Attorney, Agent, or Firm* — Fitzpatrick, Cella, Harper & Scinto

(57) ABSTRACT

A priority order of a plurality of storage locations as candidates for storing data is set in accordance with an instruction from a user. The data to be stored is acquired. A storage location of the data is decided, based on a priority order which has already been set before acquisition of the data, so as to assign a higher priority level as a storage location to a first storage location than a second storage location lower in the priority order. Data is stored in the decided storage location.

21 Claims, 16 Drawing Sheets

|   | STORAGE LOCATION | UPDATE TIME |
|---|---|---|
| 1 | PC1 Document | 12:00:00 |
| 2 | PC1 Picture | 12:00:01 |
| 3 | PC2 Document | 11:30:00 |
| 4 | PC2 Picture | 11:30:01 |

F I G. 18
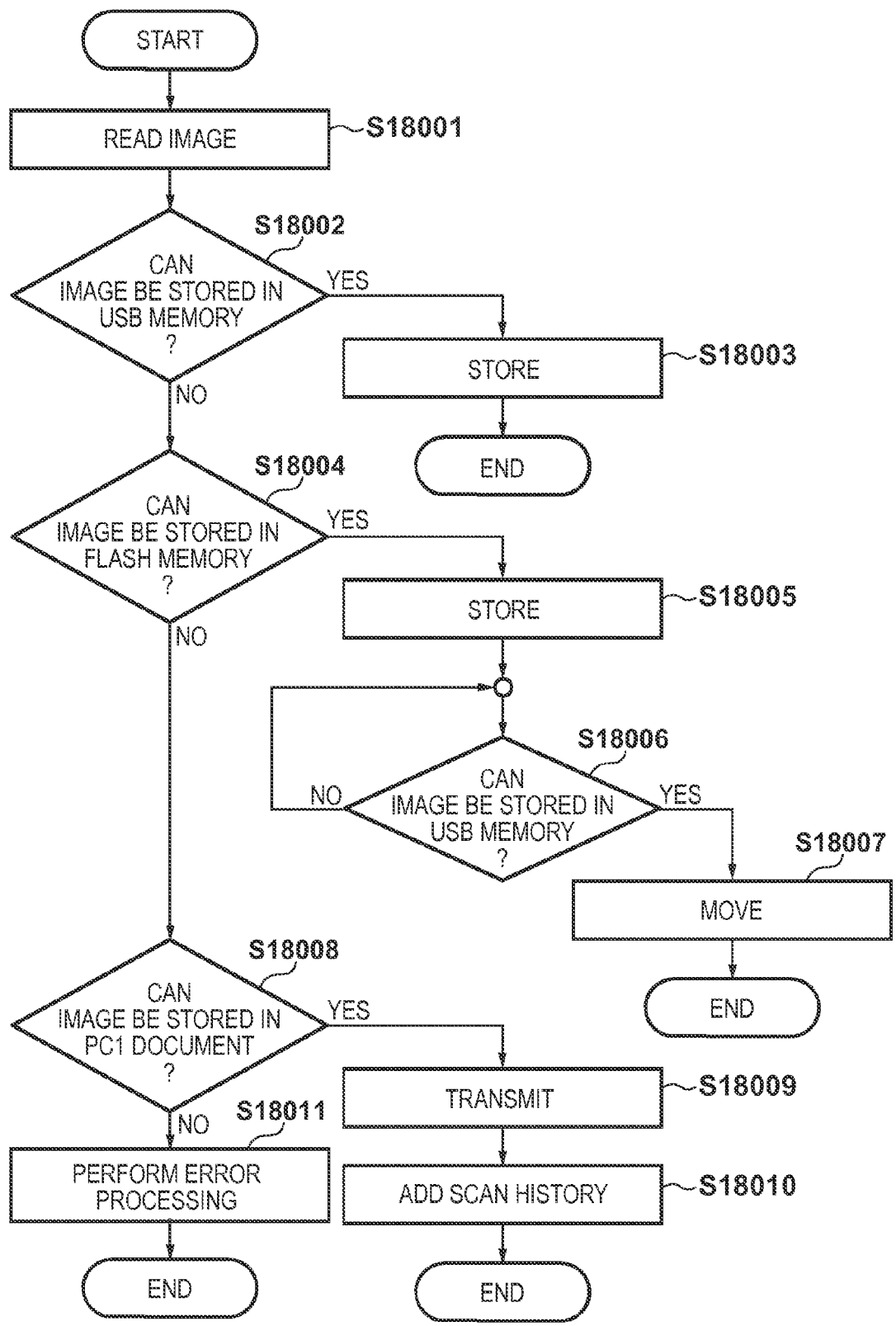

PROCESSING APPARATUS, PROCESSING METHOD AND COMPUTER-READABLE STORAGE MEDIUM

BACKGROUND OF THE INVENTION

1. Field of the Invention

The present invention relates to a processing technique of storing data.

2. Description of the Related Art

Recently, it has been practiced that the images read by image reading apparatuses are stored in portable media and network storages connected to image reading apparatuses and information processing apparatuses other than being stored in the built-in storages of information processing apparatuses. In consideration of a possibility that the portable medium will be detached, there is a proposal in which an image is temporarily stored in the built-in storage of an image reading apparatus while a portable medium is not connected, and then is transferred to the portable medium while it is connected (U.S. Pat. No. 8,027,054).

According to the arrangement of U.S. Pat. No. 8,027,054, however, while a portable medium is connected, an image is stored in the medium. For this reason, even if the user wants to store the image in, for example, a built-in storage, the image is sometimes unintentionally stored in the portable medium when the medium is connected.

SUMMARY OF THE INVENTION

The present invention provides a processing technique which can store data in a proper storage location.

A processing apparatus according to the present invention which is configured to achieve the above object has the following arrangement. That is, a processing apparatus which stores data in a memory, the apparatus comprising: a setting unit configured to set a priority order of a plurality of storage locations as candidates for storing data in accordance with an instruction from a user; an acquisition unit configured to acquire the data to be stored; a decision unit configured to decide a storage location of the data, based on a priority order already set by the setting unit before acquisition of the data by the acquisition unit, so as to assign a higher priority level as a storage location to a first storage location than a second storage location lower in the priority order; and an execution unit configured to store the data in the storage location decided by the decision unit.

The present invention can provide a processing technique which can store data in a proper storage location.

Further features of the present invention will become apparent from the following description of exemplary embodiments with reference to the attached drawings.

BRIEF DESCRIPTION OF THE DRAWINGS

FIG. 18 is a flowchart for explaining the second embodiment; and

DESCRIPTION OF THE EMBODIMENTS

The embodiments of the present invention will be described in detail below with reference to the accompanying drawings.

<First Embodiment>

Figure 1:
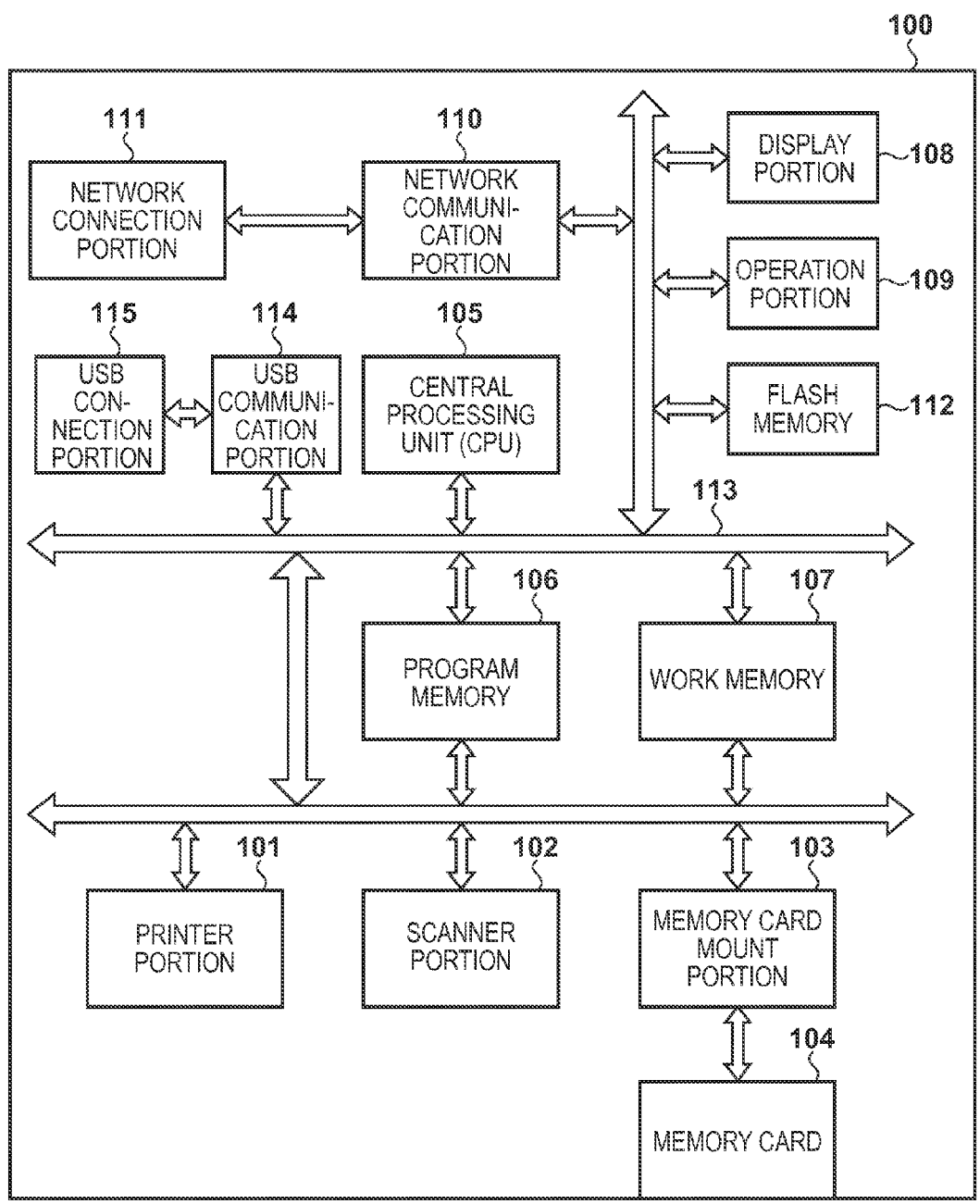
FIG. 1 is a block diagram showing the arrangement of an image reading apparatus to explain the first embodiment.

FIG. 1 is a block diagram showing the schematic arrangement of an image reading apparatus 100 according to the first embodiment. The image reading apparatus 100 includes a printer function, a scanner function, and a storage function, and can provide each function service via a network.

In the image reading apparatus 100, the printer function is implemented by a printer portion 101, and the scanner function is implemented by a scanner portion 102. The storage function is implemented by a memory card mount portion 103 and a memory card 104. In addition, a copy function can be implemented by combining the printer function and the scanner function.

The printer portion 101 prints data such as externally received print data and image data stored in the memory card 104 on a print sheet by a printing scheme such as an inkjet scheme or electrophotographic scheme. The scanner portion 102 optically reads a document set on the document table, and converts the read data into electronic data. The scanner portion 102 further converts the data into a designated file format, and transmits it to an external apparatus via a network. The copy service is a service of transferring the image data generated by reading the document placed on the document table via the scanner portion 102 to the printer portion 101 and making the printer portion 101 print the document data on a print sheet. An external apparatus connected via a network can read out a file stored in the memory card 104, edit the file, and store the file in the memory card 104.

The image reading apparatus 100 further includes a CPU (Central Processing Unit) 105 for controlling the respective types of constituent elements and a program memory 106 such as a ROM which stores data such as program codes read out by the central processing unit 105. The image reading apparatus 100 also includes a work memory 107 such as a RAM for temporarily storing or buffering data such as image data at the time of execution of each service, a display portion 108 including a display screen such as an LCD, and an operation portion 109 including switches and a touch panel. The central processing unit 105 can implement various types of processing (to be described later) by executing programs stored in the program memory 106 in the work memory 107.

The image reading apparatus 100 also includes a network communication portion 110 for performing various types of communications by connecting the image reading apparatus 100 to a network, and a network connection portion 111 for connecting the network communication portion 110 to a network medium. The network communication portion 110 corresponds to at least one of a wired network and a wireless network. If the network communication portion 110 corresponds to a wired network, the network connection portion 111 serves as a connector for connecting a wired network cable to the image reading apparatus 100. If the network communication portion 110 corresponds to a wireless network, the network connection portion 111 serves as an antenna.

In addition, the image reading apparatus 100 includes a flash memory 112 as a nonvolatile memory which can store the transmission source information of a packet received by the network communication portion 110. Furthermore, the image reading apparatus 100 includes a USB (Universal Serial Bus) communication portion 114 for communicating with an information processing apparatus 200 (FIG. 2) via a USB interface, and is connected to the information processing apparatus 200 via a USB connection portion 115 using a connector such as a USB connector.

The respective constituent elements of the image reading apparatus 100 are connected to each other via signal lines 113. As described above, the image reading apparatus also serves as an image processing apparatus which processes images by using the printer function, the scanner function, and the storage portion and as an image forming apparatus which forms images by using the printer function.

Figure 2:
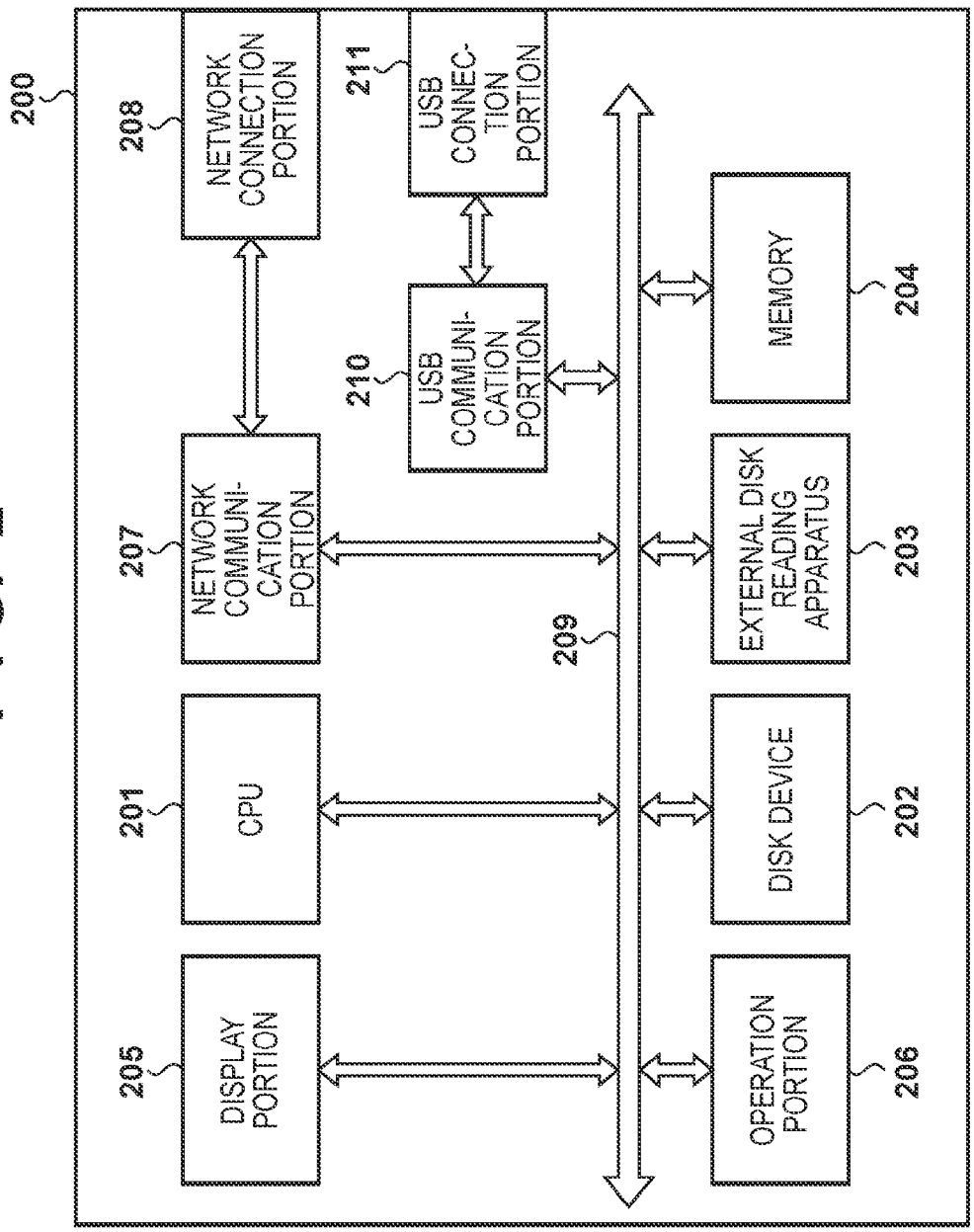
FIG. 2 is a block diagram showing the arrangement of an information processing apparatus to explain the first embodiment.

FIG. 2 is a block diagram showing the schematic arrangement of the information processing apparatus 200 according to the first embodiment. The information processing apparatus can implement various types of processing described below by installing predetermined software in a general-purpose PC.

Referring to FIG. 2, a CPU 201 controls the respective constituent elements of the information processing apparatus 200. A disk device 202 installs an application program, an OS (Operating System), and the like read out by the CPU 201, and stores data such as various types of files. An external disk reading apparatus 203 reads out contents of an external storage medium such as a CD-ROM. A memory 204 is a memory in which, for example, the CPU 201 temporarily stores or buffers data as needed. The CPU 201 can implement various types of processing (to be described later) by executing various types of programs, stored in the disk device 202, in the memory 204.

The CPU 201 installs various types of programs in the information processing apparatus 200 by executing, from the information processing apparatus 200, setup programs for software using the image reading apparatus 100. Various types of programs stored in the disk device 202 include various types of device drivers such as a scanner driver for the use of the scanner function and a printer driver for the use of the printer function. In addition, such programs include various types of applications such as a polling application for inquiring about the state (the presence/absence of an event or the like) of the image reading apparatus 100 and management software (button monitor) for managing the state (status) of the image reading apparatus 100.

A display portion 205 includes an LCD. An operation portion 206 includes a keyboard and a mouse. A network communication portion 207 performs various types of communications by connecting the information processing apparatus 200 to a network. A network connection portion 208 connects the network communication portion 207 to a network medium.

Like the image reading apparatus 100, the network communication portion 207 and the network connection portion 208 correspond to at least one of a wired network and a wireless network. More specifically, like the network communication portion 110 and the network connection portion 111 which are built into the image reading apparatus 100, the network communication portion 207 and the network connection portion 208 take necessary functions and forms in accordance with a corresponding network. Signal lines 209 connect the respective constituent elements. A USB communication portion 210 communicates with various types of peripheral devices via a USB interface. A USB connection portion 211 includes a USB connector.

In this manner, the image reading apparatus 100 can be connected to the information processing apparatus 200 via a network to construct a processing system. This network is, for example, a LAN (Local Area Network). The following description deals with a network formed from a network using wired network cables. However, the present invention is not limited to this. The form of the network remains the same regardless of whether it is a wired network or a network including both a wired network and a wireless network. An example of an image reading apparatus is an MFP (Multi Function Peripheral). However, the image reading apparatus need not always be an MFP, and may be an image scanner or digital camera.

Figure 3:
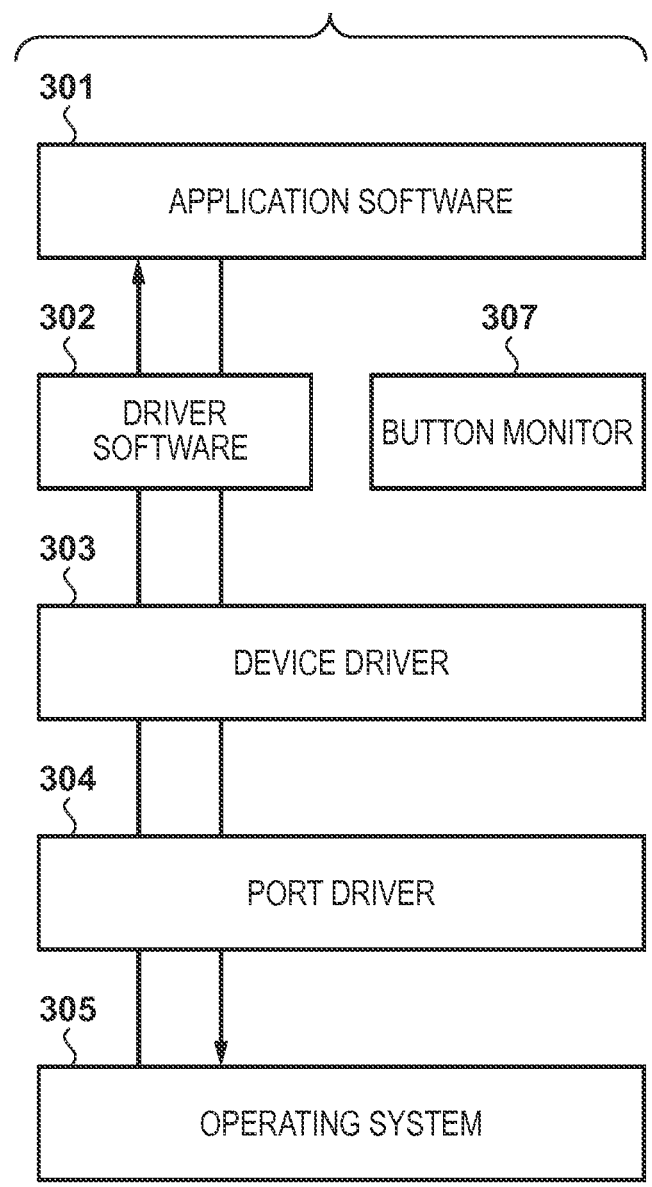
FIG. 3 is a block diagram showing the software configuration to explain the first embodiment.

FIG. 3 shows a software configuration for controlling the image reading apparatus 100. Various types of programs shown in FIG. 3 are stored in the disk device 202 of the information processing apparatus 200. The CPU 201 executes these programs.

Application software 301 designates scan settings such as a scan method, color settings, and resolution settings and instructs driver software 302 to acquire an image by using an API (Application Programming Interface). In addition, the application software 301 has a function of setting the function of the operation portion 109 of the image reading apparatus 100 and storing files in various types of formats.

In this case, APIs include, for example, TWAIN and WIA (OS standard image input APIs employed by Microsoft for WindowsMe and subsequent versions of Windows) and interfaces based on specifications unique to venders.

The driver software 302 can transfer the image acquired from the image reading apparatus 100 to the application software 301 and display a unique GUI (Graphical User Interface). The GUI has a function of, for example, designating a preview and a crop area with respect to a preview image, setting a resolution, a reading mode (a binary mode, 8-bit multivalued mode, 24-bit multivalued mode, or the like), and making color adjustment settings such as gamma correction.

A device driver 303 acquires an image by transmitting a control command for controlling firmware incorporated in the image reading apparatus 100 to the image reading apparatus 100. When dealing with the image reading apparatus 100 in which no firmware is incorporated, the device driver 303 performs various types of control by accessing the control registers of the respective modules of the image reading apparatus 100. For example, the device driver 303 performs shading control, motor speed setting in accordance with a resolution and a crop range, transmission processing of gamma correction data received from the driver software 302 to the image reading apparatus 100, and procedure control for image reading.

A port driver 304 performs communication control with respect to the image reading apparatus 100 in accordance with an interface such as a parallel interface, USB interface, IEEE1394 interface, SCSI interface, LAN interface, or Wireless LAN interface. A button monitor 307 is a module which detects whether a button on the operation portion 109 of the image reading apparatus 100 has been pressed. The button monitor 307 always detects, at given predetermined intervals, whether a button has been pressed. Upon detecting that a button has been pressed, the button monitor 307 notifies the application software 301 of information corresponding to the pressed button. The application software 301 then reads an image under the conditions set for each button.

An OS (Operating System) 305 is the basic system of the information processing apparatus 200, such as Windows®. The port driver 304, the device driver 303, the driver software 302, the button monitor 307, and the application software 301 are implemented on the OS 305.

Figure 4:
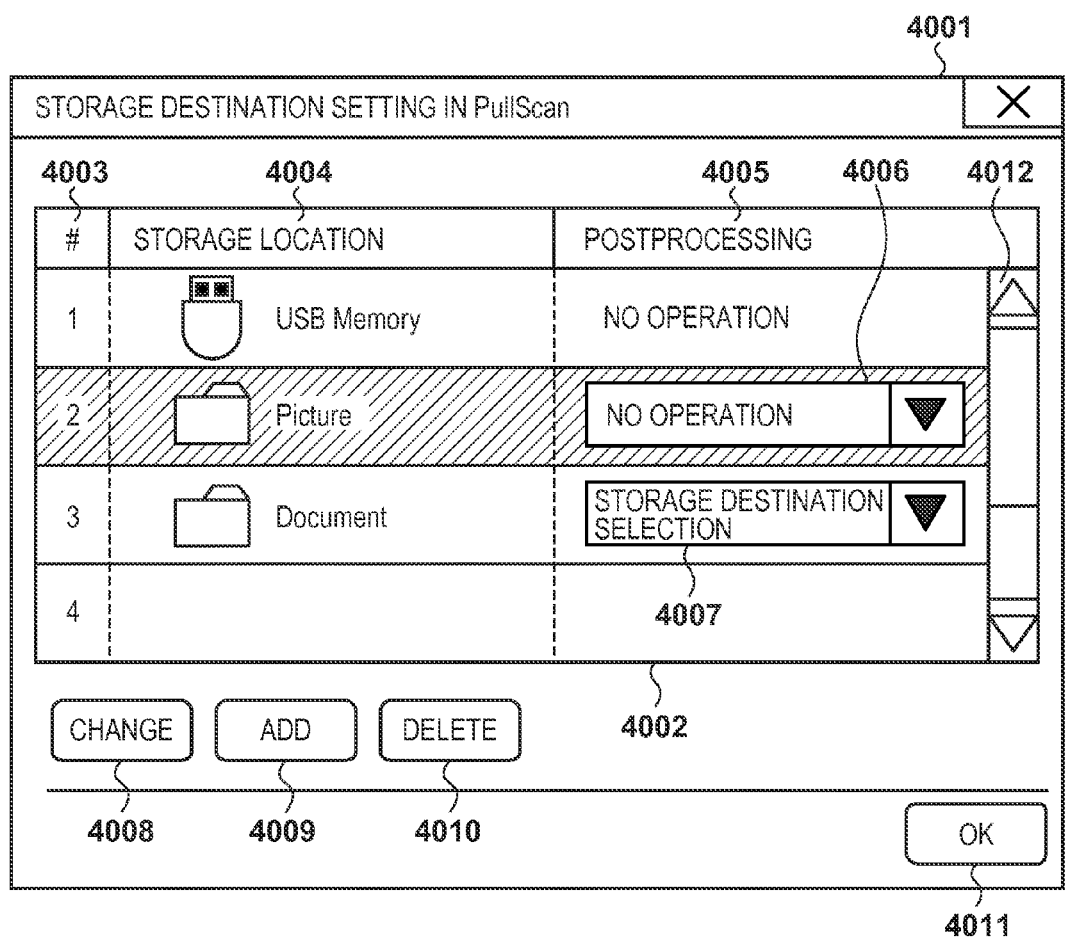
FIG. 4 is a view showing a user interface to explain the first embodiment.

FIG. 4 shows a UI (User Interface) displayed on the information processing apparatus 200 to execute the first embodiment. This UI is displayed when the CPU 201 of the information processing apparatus 200 executes the application software 301.

This UI is a UI program which makes PullScan setting for issuing an instruction to read an image when the user operates the information processing apparatus 200. The UI displays a UI window 4001 which is a setting window on the display portion 205 of the information processing apparatus 200, and displays a list control UI 4002 in the UI window 4001. The list control UI 4002 is a UI control which displays a plurality of items in a plurality of rows/a plurality of columns.

The elements of the list control UI include column bars 4003, 4004, and 4005. The column bar 4003 displays a column indicating the order (priority order) of the storage locations (to be described in detail later) of data and postprocessing. The column bar 4004 displays a column indicating the storage locations. The column bar 4005 displays a column indicating postprocessing.

In the case shown in FIG. 4, the USB memory which can be connected to the USB connection portion 211 of the information processing apparatus 200 is assigned with the highest priority as a data storage location, and the folder "Picture" formed in the disk device 202 is assigned with the second highest priority. Assume that in this setting state, the image reading apparatus 100 has read a document. In this case, if a USB memory is connected to the information processing apparatus 200, the read image is stored in the USB memory. If no USB memory is connected to the information processing apparatus 200, the image is stored in folder "Picture".

In addition, "Document" is designated at the third highest priority level. With respect to "Document", "storage destination selection" is designated as postprocessing. Assume that this "storage destination selection" is designated. In this case, when a document is read, and "Document" is a storage destination candidate for the read image, a window for selecting a storage destination is displayed. The user can select a storage destination in this window at the time of document reading. This operation will be described in detail later.

On the other hand, "no operation" is set as postprocessing with respect to the USB memory and "Picture" at the highest priority level and the second highest priority level. In this case, the above window displaying operation is not performed at the time of document reading, and the read image is stored in a storage destination in accordance with the priority order. This allows the user to store the read image in a storage designation decided in accordance with the predetermined priority order without selecting any storage destination at the time of document reading.

Note that the list shown in FIG. 4 may include both a memory incorporated in or connected to the information processing apparatus 200 and a memory incorporated in or connected to the image reading apparatus 100. That is, a priority order is set concerning whether to store a read image in the image reading apparatus 100 or the information processing apparatus 200.

On the list control UI 4002 shown in FIG. 4, data can be displayed in four rows, and more rows can be displayed by changing the display area using a scroll bar UI 4012 arranged on the right side of the list control UI 4002. In another form, it is not always necessary to display four rows on the list control UI. Referring to FIG. 4, values are currently set only on the first, second, and third rows, and the second row is selected, and hence the second row is displayed in a form different from that of the remaining rows so as to make it possible to identify the selected state.

Combo boxes 4006 and 4007 displayed on the column bar 4005 each allow the user to select one of a plurality of options. FIG. 4 shows a state in which "no operation" is selected with the combo box 4006 on the second row, and "storage destination selection" is selected with the combo box 4007 on the third row.

When the user presses a change button 4008, an add button 4009, a delete button 4010, and an OK button 4011, processing programmed with respect to each button is executed. The details of an operation to be performed when the user presses each of these buttons will be described below.

The UI shown in FIG. 4 is an example, which differs in how it looks or an expression method depending on the type or version of an OS, window manager, or the like.

Figure 5:
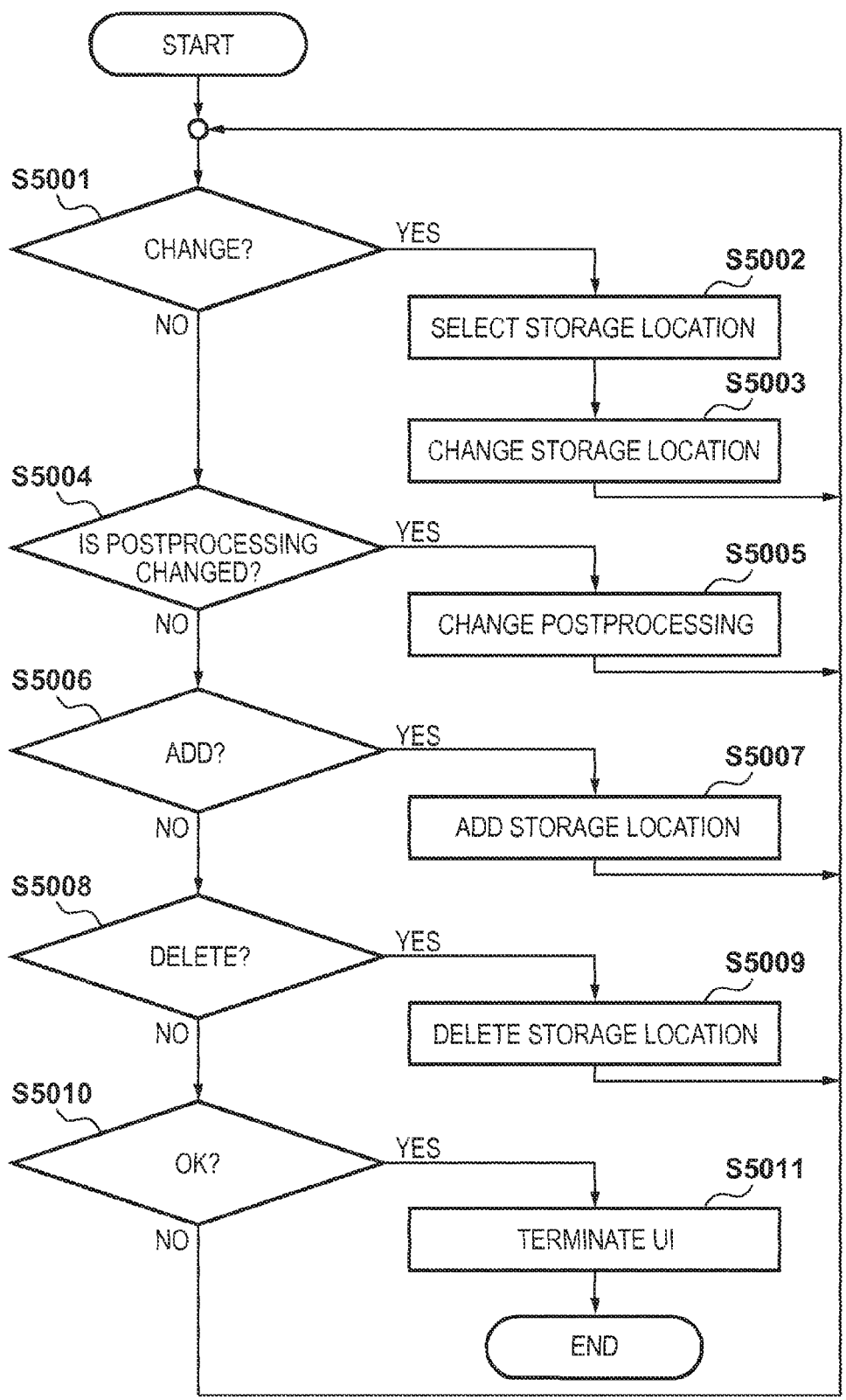
FIG. 5 is a flowchart for explaining the first embodiment.

Operation processing of the UI in FIG. 4 which is used to execute the first embodiment will be described with reference to FIG. 5. The processing shown in FIG. 5 is implemented when the CPU 201 of the information processing apparatus 200 executes the application software 301.

In step S5001, the application software 301 determines whether the user has pressed the change button 4008. It is conceivable to implement this determination by, for example, a method of performing determination based on the ID included in UI processing of the OS upon assigning a unique ID to each button. When the user has pressed the change button 4008 (YES in step S5001), the process advances to step S5002. If the user has not pressed the change button 4008 (NO in step S5001), the process advances to step S5004.

In step S5002, the application software 301 performs storage location selection processing. A storage location selection UI (not shown) prepared by the OS is displayed. This storage location selection UI includes, as selection candidates, a folder already set in the disk device 202 of the information processing apparatus 200 and an external memory such as a USB memory. The storage location selection UI displays an external memory such as a USB memory regardless of whether it is connected. That is, even if a USB memory is not connected at this stage of display, it is possible to select the USB memory as a storage destination. For example, after the user sets the priority order of storage destinations in the window shown in FIG. 4, a USB memory may be connected to the information processing apparatus 200 when the image reading apparatus 100 is made to read a document.

The user can select a new storage location with this storage location selection UI. The application software 301 selects a storage location in accordance with the selecting operation by the user.

In step S5003, the application software 301 sets a storage location to the storage location selected in step S5002. If the storage location before selection differs from the selected storage location, the storage destination is changed. If, for example, it is determined in step S5001 that the user has pressed the change button 4008, the storage location on the second row selected with the list control UI 4002 is changed to the new storage location selected by the user in step S5002.

Figure 6:
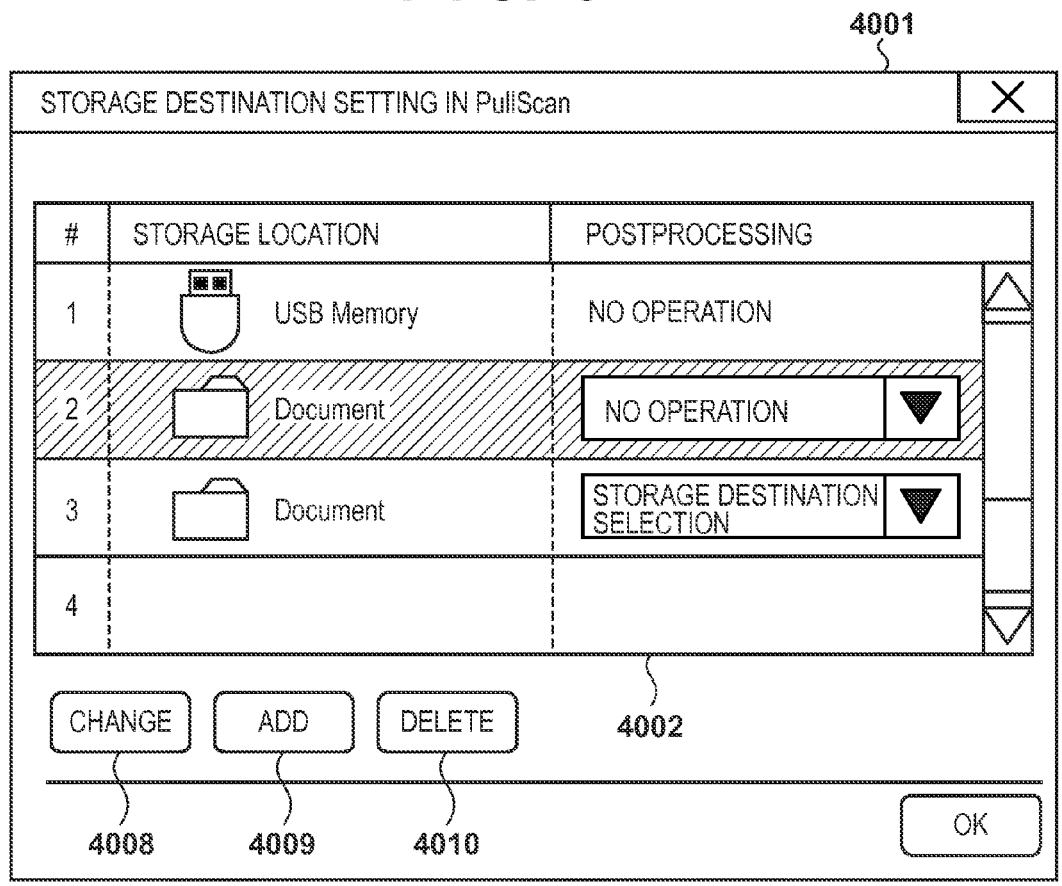
FIG. 6 is a view showing a user interface to explain the first embodiment.

FIG. 6 shows the state of the UI window 4001 after the end of the processing in step S5003. If the user has selected "Document" as a new storage location in step S5002, the storage location on the second row selected by the user with the list control UI 4002 is changed from "Picture" to "Document".

In step S5004, the application software 301 determines whether postprocessing has been changed. In this determination processing, it is determined whether postprocessing has been changed, depending on whether the selected content in the combo box 4006 or 4007 has been changed by a user's operation. If the selected content has been changed, that is, the postprocessing has been changed (YES in step S5004), the process advances to step S5005. If the selected content has not been changed, that is, the postprocessing has not been changed (NO in step S5004), the process advances to step S5006.

In step S5005, the application software 301 changes the postprocessing to the selected content changed in step S5004.

In step S5006, the application software 301 determines whether the user has pressed the add button 4009. If the user has pressed the add button 4009 (YES in step S5006), the process advances to step S5007. If the user has not pressed the add button 4009 (NO in step S5006), the process advances to step S5008.

In step S5007, the application software 301 adds the storage location to the list control UI 4002. More specifically, the storage location selection UI displayed in step S5002 is displayed, and the user selects a storage location to be added. Referring to FIG. 4, since the list control UI 4002 includes storage locations on three rows, when the user presses the add button 4009, the fourth row is added. A storage location and postprocessing may be added by using preset values or may be checked by the user when they are added.

Figure 7:
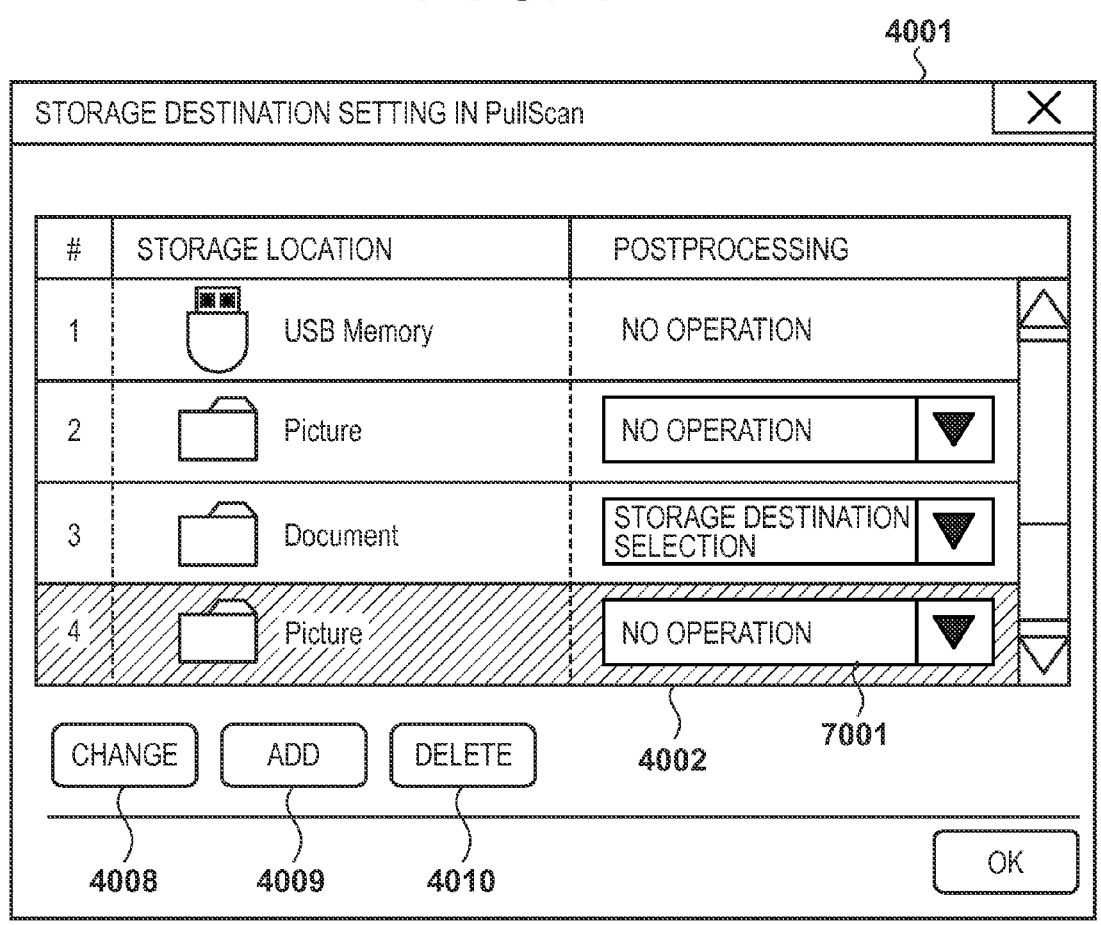
FIG. 7 is a view showing a user interface to explain the first embodiment.

FIG. 7 shows the state of the UI window 4001 after the end of processing in step S5007. When the user presses the add button 4009 in the state shown in FIG. 4, the fourth row is added to the list control UI 4002 to set "Picture" as a storage location and "no operation" as postprocessing.

In step S5008, the application software 301 determines whether the user has pressed the delete button 4010. If the user has pressed the delete button 4010 (YES in step S5008), the process advances to step S5009. If the user has not pressed the delete button 4010 (NO in step S5008), the process advances to step S5009.

In step S5009, the application software 301 deletes the row selected with the list control UI 4002. Referring to FIG. 4, since the second row is selected, the second row is deleted, and the third row is moved to the second row.

In step S5010, the application software 301 determines whether the user has pressed the OK button 4011. If the user has pressed the OK button 4011 (YES in step S5010), the process advances to step S5011. If the user has not pressed the OK button 4011 (NO in step S5010), the process advances to step S5001.

In step S5011, the application software 301 stores the updated contents (the set state in FIG. 4) as setting information in the memory 204 based on changing/adding/deleting by a user's operation. Thereafter, the display of the UI window 4001 is terminated.

Figure 8:
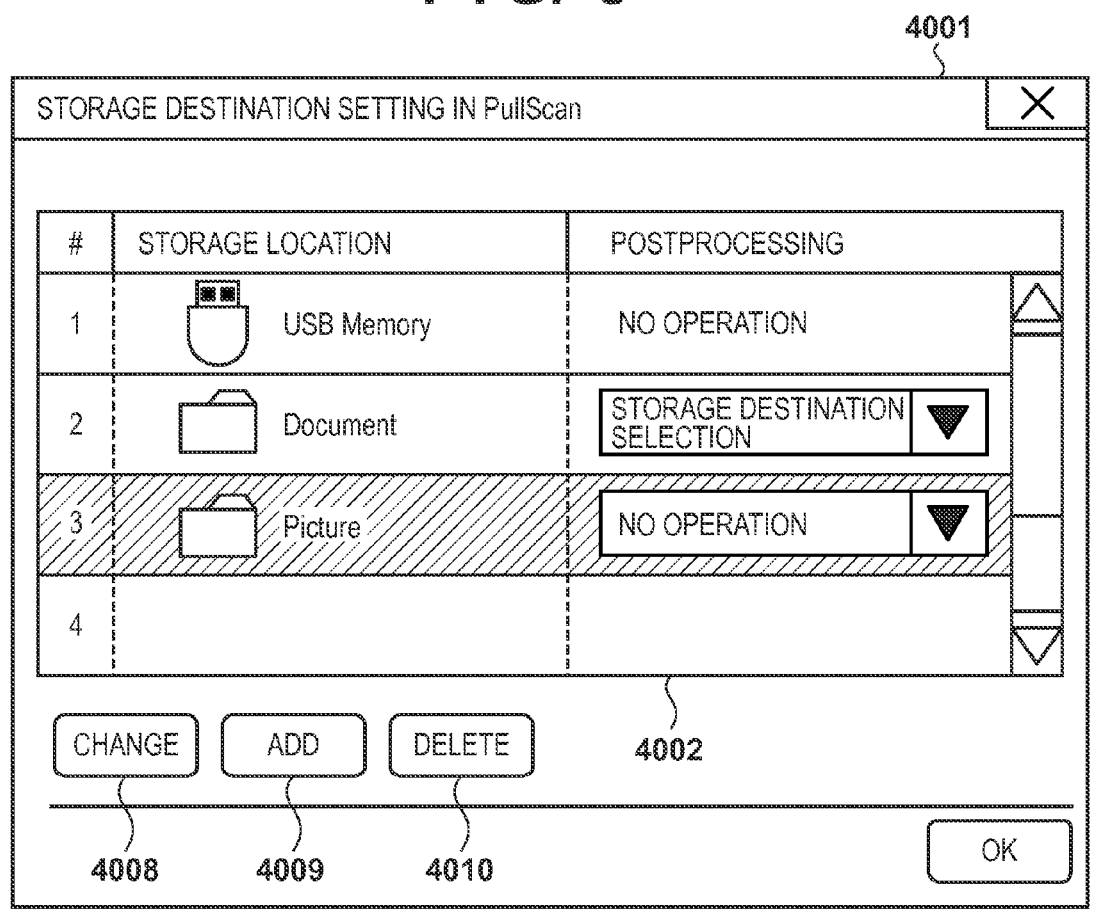
FIG. 8 is a view showing a user interface to explain the first embodiment.

As described above, the user can add/change/delete a plurality of storage locations with respect to the list control UI 4002, and individually set postprocessing for each storage location. In addition, it is possible to freely change the order of storage locations on the list control UI 4002 by adding/changing/deleting storage locations. For example, as shown in FIG. 8, it is possible to interchange the second and third rows on the list control UI 4002 in FIG. 4.

Although not described in the flowchart of FIG. 5, some OS may provide an arrangement configured to permit a row interchanging operation performed by dragging and dropping a row on the list control UI 4002 with a pointing device such as a mouse. Such an OS allows the user to interchange the order of rows (storage locations) by an intuitive operation without using any adding/changing/deleting operation.

Figure 9:
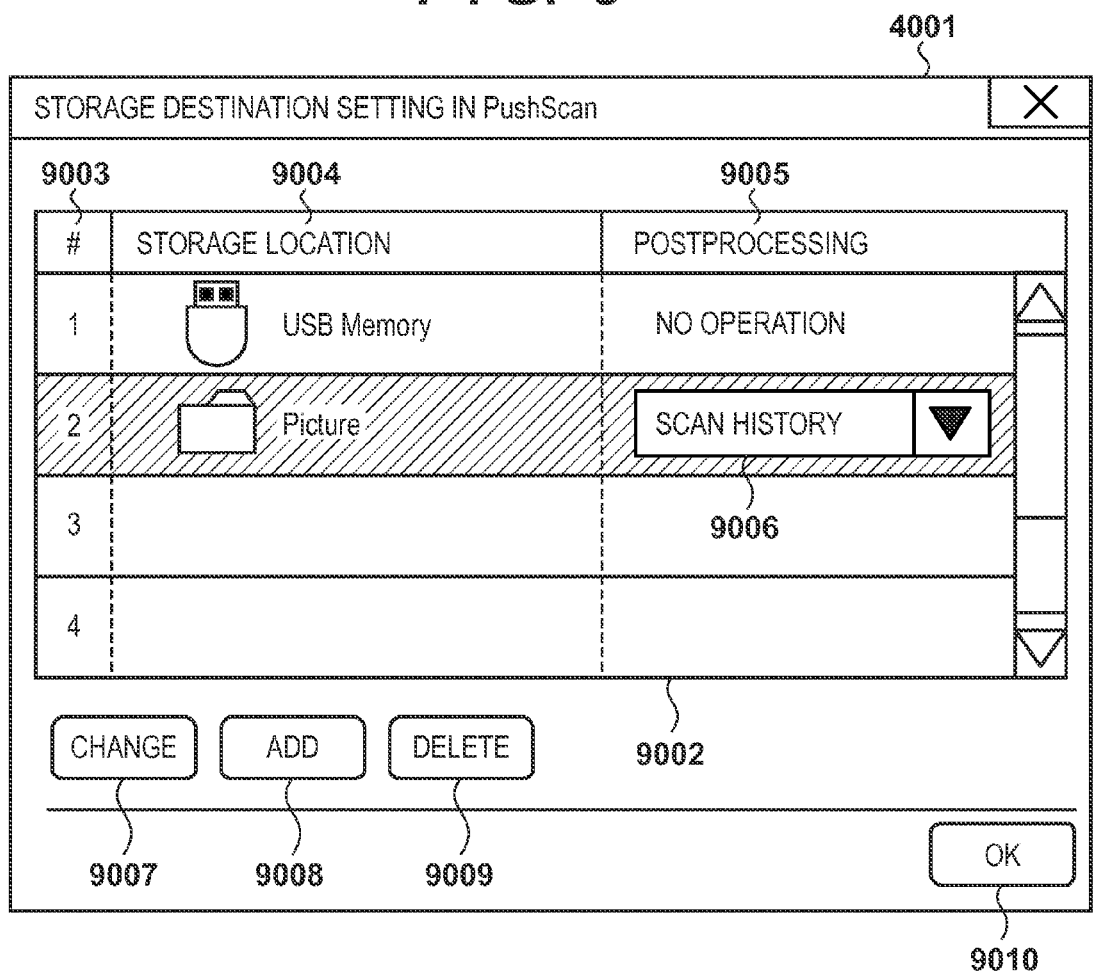
FIG. 9 is a view showing a user interface to explain the first embodiment.

Although FIG. 4 explains the setting contents (storage destination settings) of PullScan, it is possible to set the order of storage locations concerning the setting contents (storage destination settings) of PushScan by similar processing. Note that PushScan will be described in detail later with reference to FIG. 9. Referring to FIG. 9, the UI window 4001 includes a list control UI 9002, column bars 9003, 9004, and 9005, a combo box 9006, a change button 9007, an add button 9008, a delete button 9009, and an OK button 9010, which have functions similar to those in FIG. 4.

In this case, PullScan indicates a method of reading a document and acquiring an image by issuing a scan instruction from the information processing apparatus 200 serving as a host apparatus to the image reading apparatus 100 such as a scanner. In contrast, PushScan indicates a method of reading a document and acquiring an image (transmitting an image to the information processing apparatus 200) by an operation from the operation portion 109 of the image reading apparatus 100 instead of an operation from the host apparatus.

Image read processing according to the first embodiment will be described next with reference to FIGS. 10 to 12. The information processing apparatus 200 executes the processing shown in FIGS. 10 to 12. More specifically, programs corresponding to the respective types of processing are stored in the disk device 202. The CPU 201 then implements the processing shown in FIGS. 10 to 12 by executing the programs in the memory 204.

In step S10001, the CPU 201 of the information processing apparatus 200 acquires the read image which the image reading apparatus 100 has obtained by reading a document. In the case of PullScan, the CPU 201 performs read control to cause the image reading apparatus 100 to read a document by executing a program corresponding to the device driver 303. In step S10001, the CPU 201 acquires the read image obtained by this read control. In the case of PushScan, a document is read in accordance with a user's operation with respect to the operation portion 109 of the image reading apparatus 100. In step S10001, the read image is acquired.

In step S10002, the application software 301 determines whether the currently set function is PullScan of starting image reading in accordance with a user's operation via a UI. If the function is PullScan (YES in step S10002), the process advances to step S10003. If the function is not PullScan (NO in step S10002), it is determined that PushScan is set, which starts image reading by operating the image reading apparatus 100. The process then advances to the flowchart of FIG. 12.

Assume that in the following description, which concerns the processing of deciding a storage location, the setting order of storage locations is displayed on the list control UI 4002 in FIG. 4. In this case, as described above, this setting state is registered as setting information in the memory 204 of the information processing apparatus 200, and the information processing apparatus 200 executes the flowchart of FIG. 5 by referring to the setting information. Note that as described with reference to the flowchart of FIG. 5, since the user can freely change the display order on the list control UI 4002, processing different from that based on the flowchart to be described below may be performed depending on user's settings.

In step S10003, the application software 301 determines whether the image acquired in step S10001 can be stored in the storage location (the storage destination at the highest priority level) set on the first row on the list control UI 4002 in FIG. 4. Referring to FIG. 4, since "USB Memory" is set at the storage location at the highest priority level, it is determined whether a USB memory is accessibly inserted in a USB port of the information processing apparatus 200 to allow the image to be stored.

In this determination, it may be determined that the image can be stored, if, for example, the CPU 201 can access the USB memory by accessing the USB connection portion 211 via the USB communication portion 210. Alternatively, a flag indicating connection may be set in the disk device 202 when a USB memory is connected to the USB connection portion 211. In this case, in step S10003, the CPU 201 performs the determination by checking whether the above flag is set. Alternatively, when connection is made, the CPU 201 may check the remaining capacity of the USB memory, regardless of whether the USB memory is connected, and may determine that the image can be stored, if the remaining capacity is equal to or more than a predetermined amount. In this case, the data capacity of the read image acquired in step S10001 is set as the above predetermined amount. It is then determined whether the image can be stored, by comparing the data capacity with the remaining capacity of the memory.

Also, whether the image can be stored can be determined by the generation method of the data to be stored. For example, it is possible to determine that the image data read from the image reading apparatus 100 by the control of the information processing apparatus 200 can be stored. On the other hand, it is possible to determine that the image data which is read from the image reading apparatus 100, stored in the memory card 104, and subsequently transferred to the information processing apparatus 200 by the control of the central processing unit 105 of the image reading apparatus 100 cannot be stored. Concerning other data storage methods, it is possible to determine whether the data can or cannot be stored depending on the type of a reading method such as a method of reading an image from a document set on a document table, a method of reading an image from a document set on an automatic document feeder (ADF), or the like. The determination method of whether the data can or cannot be stored can be opposite to the proposed example. It is possible to determine that while the image data read from the image reading apparatus 100 by the control of the information apparatus 200 cannot be stored, the image data read otherwise can be stored.

In addition, whether the image can be stored can be determined by an analysis result of data to be stored. It is possible, if the image data is a binary image or a gray scale image, to determine that the image data is a document image and can be stored. If the image data is a color image, it is possible to determine that the image data is a picture image and cannot be stored. Also, it is possible to generate a histogram of the image data and determine the image data to be a document image if it is close to a binary image or a gray scale image, otherwise it is determined to be a color image, and whether the image data can be stored is determined. The determination method of whether the data can or cannot be stored can be opposite to the proposed example. It is possible to determine that the image data cannot be stored if it is a document image, and that the image data can be stored if it is a color image.

Also, whether the image can be stored can be determined by the capacity of the data to be stored. For example, if the stored data is equal to or less than a predetermined amount (for example, 10 MB), it is determined that the image data can be stored. If the stored data is more than the predetermined amount, it is determined that the image data cannot be stored. Further, it is possible to determine that the data can be stored if the stored data is equal to or less than a predetermined amount, select an email client as a subsequent startup application, and transmit the stored data by email.

Figure 20:
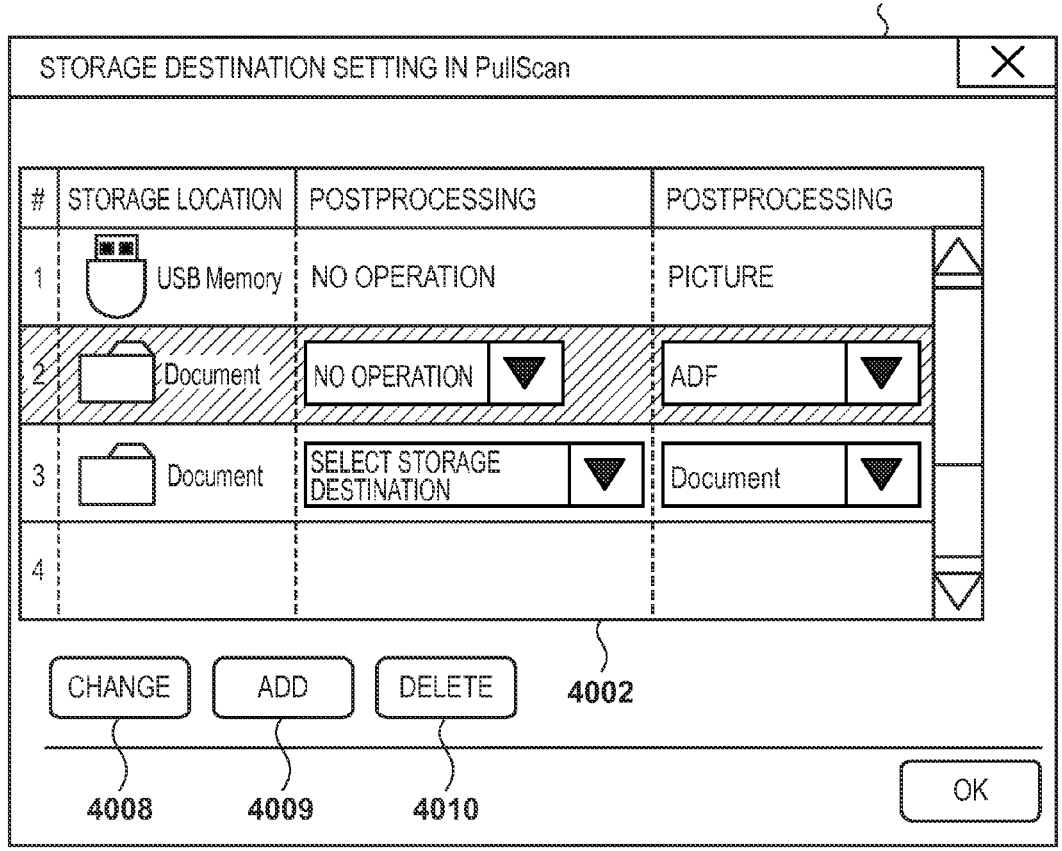
FIG. 20 is a view showing a user interface to explain the second embodiment.

Since several determination methods can be considered for determining whether the image can be stored, the user can select what type of storage condition is possible for storing the image data using a UI window 20001 shown in FIG. 20. The UI window 20001 shown in FIG. 20 shows that the condition for storing image data in the USB memory is set only for the image data determined to be a picture, and that the image data read from the automatic document feeder (ADF) and the image data determined to be a document will be stored in the folder "Document".

Note that the UI window 20001 shown in FIG. 20 has an arrangement in which the items for selecting the storage conditions have been added to the UI window 4001 shown in FIG. 4. The same reference numerals are given to the UI control in common with the window UI 4001 shown in FIG. 4.

If the image cannot be stored (NO in step S10003), the process advances to step S10005. If the image can be stored (YES in step S10004), the process advances to step S10004.

In step S10004, the application software 301 stores the image, acquired in step S10001, in the USB memory. In addition, since "no operation" is selected as corresponding postprocessing in FIG. 4, the processing is terminated without any operation after the storing operation.

In step S10005, the application software 301 determines whether the image acquired in step S10001 can be stored in the storage location (the storage destination at the second highest priority level) set on the second row on the list control UI 4002 in FIG. 4. Referring to FIG. 4, since "Picture" is set as a storage location, it is determined whether it is possible to access the "Picture" folder in the information processing apparatus 200 and store the image in the folder. In this determination, the CPU 201 determines, for example, whether any access limitation is imposed on "Picture". If the image cannot be stored (NO in step S10005), the process advances to step S10007. If the image can be stored (YES in step S10005), the process advances to step S10006.

In step S10006, the application software 301 stores the image, acquired in step S10001, in the "Picture" folder. In addition, since "no operation" is selected as corresponding postprocessing in FIG. 4, the processing is terminated without any operation after the storing operation.

In step S10007, the application software 301 determines whether the image acquired in step S10001 can be stored in the storage location (the storage destination at the third highest priority level) set on the third row on the list control UI 4002 in FIG. 4. This determination is performed by processing similar to the determination in step S10005. Referring to FIG. 4, since "Document" is set as a storage location, it is determined whether it is possible to access the "Document" folder in the information processing apparatus 200 and store image in the folder. If the image cannot be stored (NO in step S10007), the process advances to step S10010. If the image can be stored (YES in step S10007), the process advances to step S10008.

In step S10008, since "storage location selection" is set as postprocessing on the third row on the list control UI in FIG. 4, the application software 301 executes storage location selection processing. In this case, for example, the application software 301 displays a storage destination selection window 11001 like that shown in FIG. 11 on the display portion 205 of the information processing apparatus 200. The currently selected storage location is set on a UI element 11002. Since "Document" is set as the storage location on the third row on the list control UI 4002 in FIG. 4, "Document" is set on the UI element 11002.

When the user presses a change button 11003, the storage location selection UI prepared by the OS is displayed. The user can select a storage location via this UI. More specifically, when the user presses the change button 11003, the storage location selection UI to be displayed when the change button in FIG. 4 is pressed is displayed to decide a priority order, and the user can designate a storage location other than the "Document" folder. Note however that on this UI, unlike the case of priority order decision, an external memory such as a USB memory which is actually connected is displayed as a selection candidate, but any external memory which is not connected to a predetermined interface is not displayed as a selection candidate. This can prevent a situation in which the external memory selected by the user is not connected, and a storing operation cannot be performed.

When the user presses an OK button 11004 upon completion of the selection, the value set on the UI element 11002 is designated as a storage location.

In step S10009, the application software 301 stores the image read in step S10001 in the storage location designated in step S10008, and terminates the processing.

In step S100010, the application software 301 executes error processing because the image read in step S10001 cannot be stored in any of all the designated storage locations. Since three storage locations are set on the list control UI 4002 in FIG. 4, it is determined whether the image can be stored in any of the three storage locations. Only when the image cannot be stored in any storage location, the process advances to step S10010. If, for example, four or more storage locations are set, the determination whether the image can be stored in a storage location is repeated by the number of times corresponding to the number of storage locations set.

Figure 11:
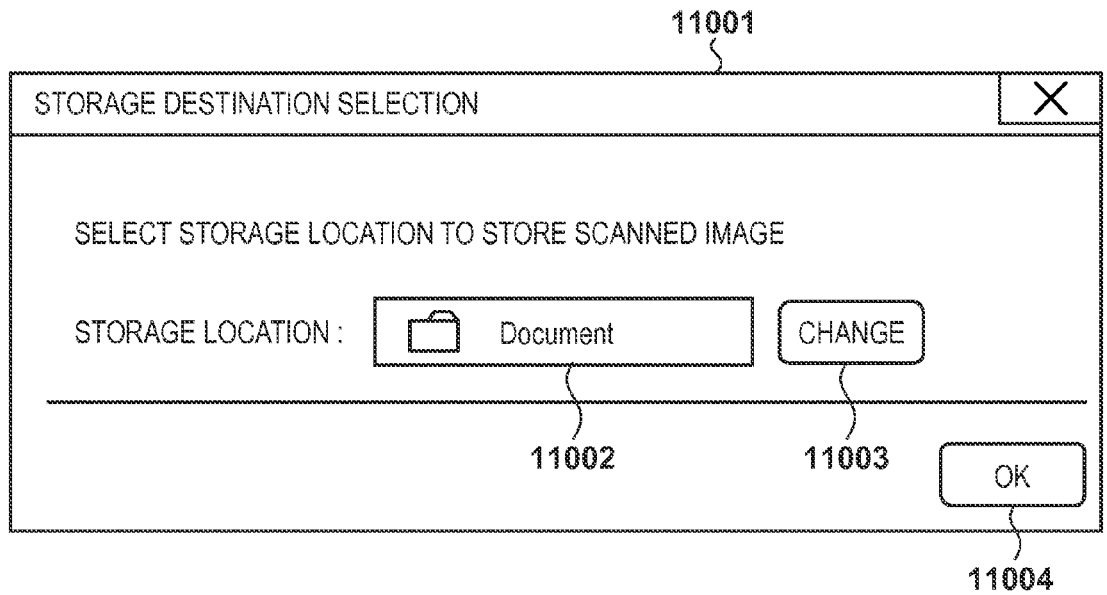
FIG. 11 is a view showing a user interface to explain the first embodiment.
Figure 12:
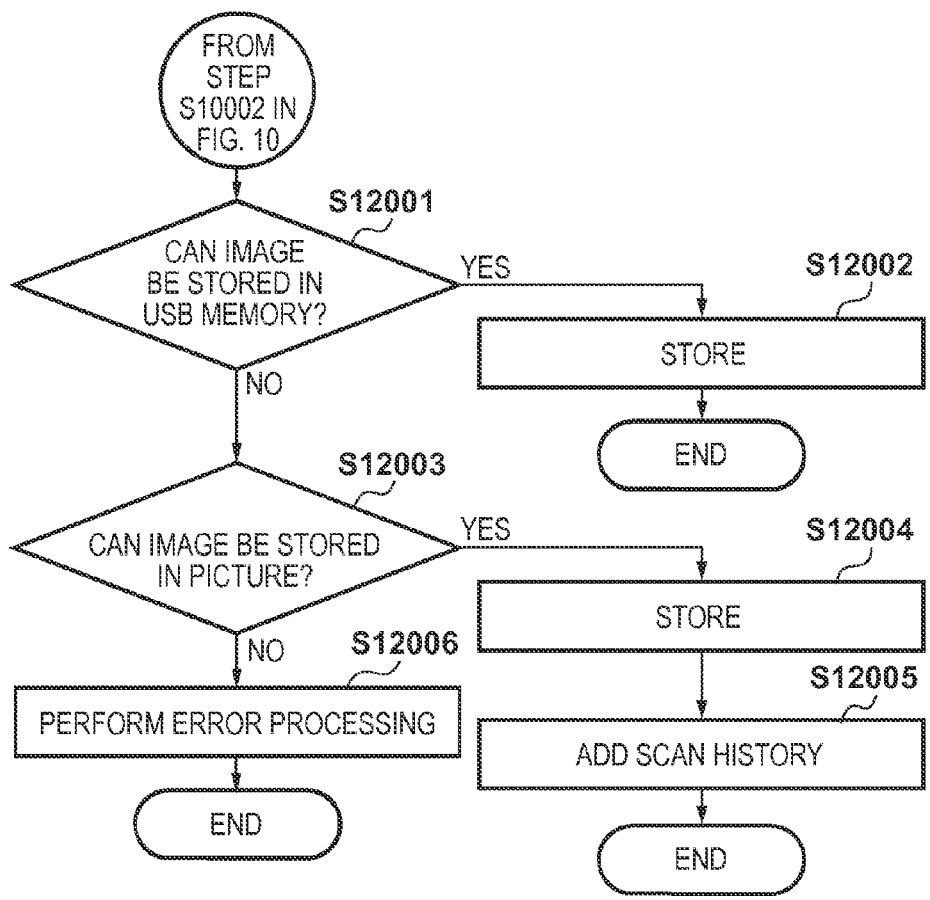
FIG. 12 is a flowchart for explaining the first embodiment.

In addition, error processing may include displaying a simple error message and displaying the storage destination selection window 11001 in FIG. 11 to prompt the user to select a storage location again.

The processing to be performed when it is determined in step S10002 in FIG. 10 that the currently set function is PushScan will be described next with reference to FIG. 12.

Figure 10:
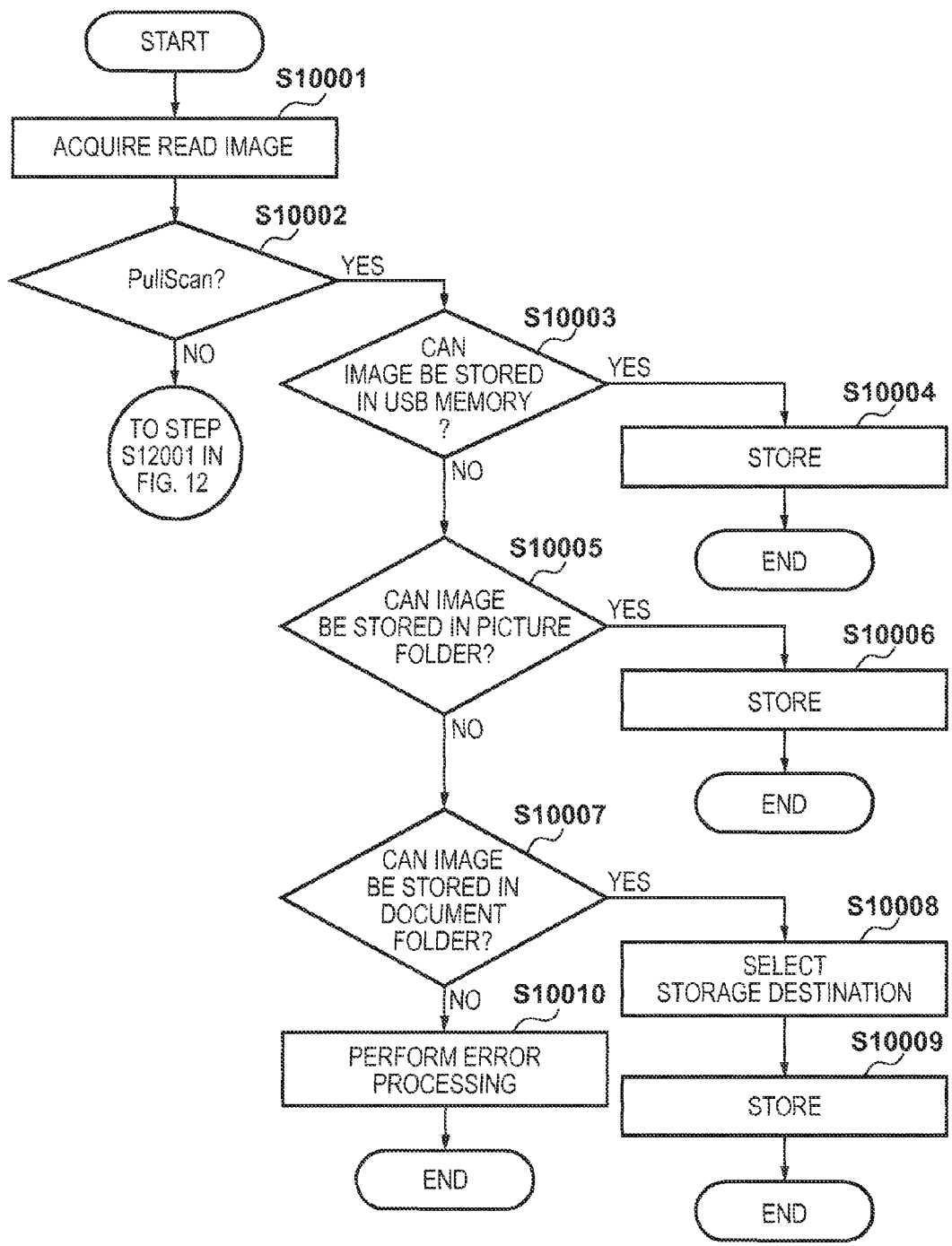
FIG. 10 is a flowchart for explaining the first embodiment.

Assume that the priority order of storage destinations of a read image obtained by PushScan is registered by the UI shown in FIG. 9 before the read image is acquired in FIG. 10 (before, for example, a user instruction to execute PullScan or PushScan is issued).

It is possible to register the priority order of storage destinations in the same manner as in the case of PullScan, as indicated by column bars 9003 and 9004 in FIG. 9. More specifically, by pressing the buttons 9007, 9008, and 9009, the user can edit the priority order by changing, adding, and deleting a storage destination. In addition, it is possible to set "scan history" as postprocessing. This "scan history" will be described later.

In step S12001, the application software 301 determines whether the image can be stored in the storage location set on the first row on the list control UI 9002 in FIG. 9. Referring to FIG. 9, since "USB Memory" is set at a storage location, it is determined whether a USB memory is accessibly inserted in a USB port of the information processing apparatus 200 to allow the image to be stored. This determination processing is performed in the same manner as in the determination processing in step S10003. If the image cannot be stored (NO in step S12001), the process advances to step S12003. If the image can be stored (YES in step S12001), the process advances to step S12002.

In step S12002, the application software 301 stores the image read in step S10001 in the USB memory. In addition, since "no operation" is selected as corresponding postprocessing in FIG. 9, the processing is terminated without any operation after the storing operation.

In step S12003, the application software 301 determines whether the image can be stored in the storage location set on the second row on the list control UI 9002 in FIG. 9. Referring to FIG. 9, since "Picture" is set as a storage location, it is determined whether it is possible to access the "Picture" folder in the information processing apparatus 200 and store the image in the folder. This determination is performed in the same manner as in the determination processing in step S10005. If the image cannot be stored (NO in step S12003), the process advances to step S12006. If the image can be stored (YES in step S12003), the process advances to step S12004.

In step S12004, the application software 301 stores the image, read in step S10001, in the "Picture" folder.

In step S12005, the application software 301 sets "scan history" with the combo box 9006 postprocessing on the second row on the list control UI 9002 in FIG. 9. In this case, the path of the stored image (storage destination information (information for specifying a storage location)) is added as history information to the scan history managed as data by the information processing apparatus 200.

Figure 13:
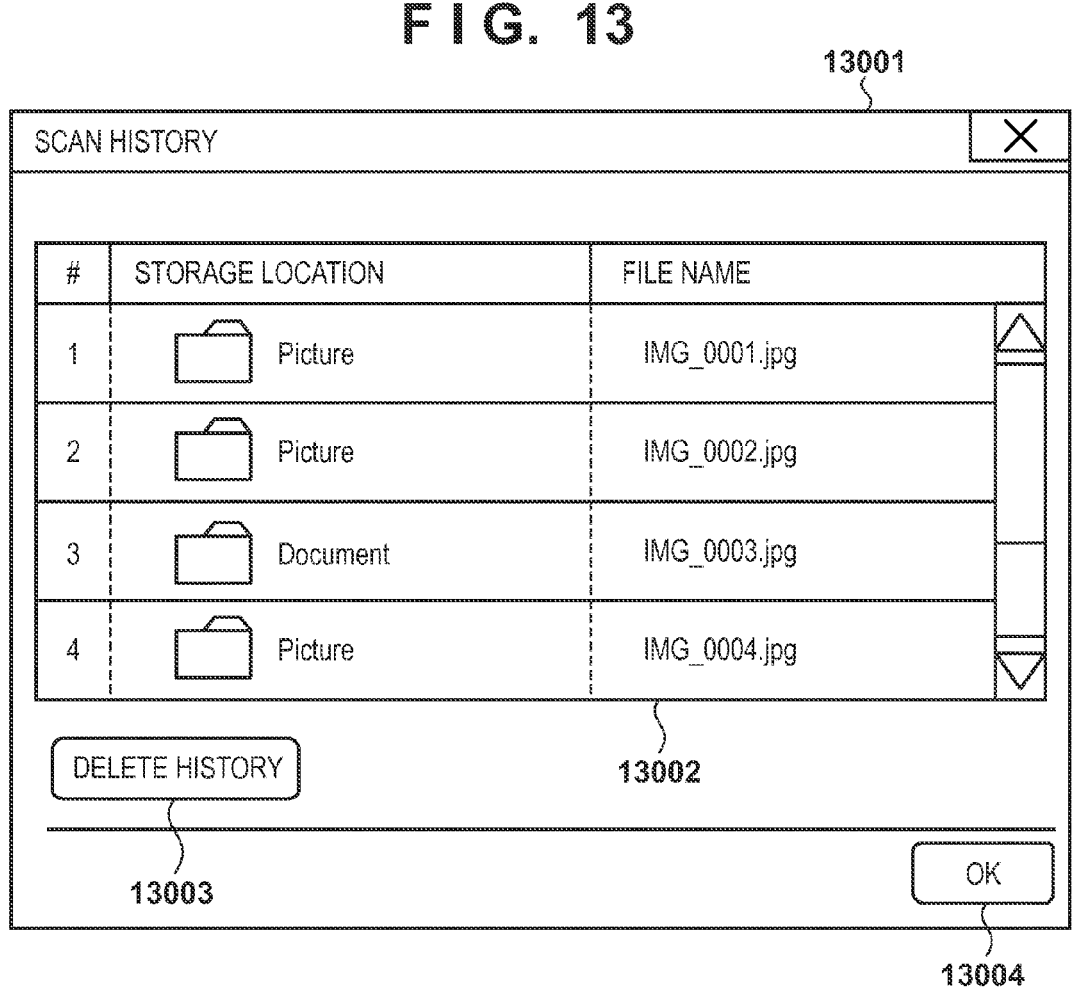
FIG. 13 is a view showing a user interface to explain the first embodiment.

The scan history managed by the information processing apparatus 200 can be displayed in a scan history window 13001 as the window UI shown in FIG. 13. In addition to the scan history which has already been managed, an added scan history is displayed on a list control UI 13002 in the scan history window 13001. It is possible to delete a past history by pressing a history delete button 13003. It is also possible to finish displaying the scan history window 13001 by pressing an OK button 13004.

The scan history displayed in the scan history window 13001 is not synchronous with the operation of PushScan. The user can display the scan history window 13001 at a desired timing when the application software 301 is activated. This makes it possible to check the image read upon displaying the scan history window 13001 after the user notices that no image is stored in the USB memory upon performing PushScan a plurality of times.

In step S12006, the application software 301 executes error processing because the image read in step S10001 cannot be stored in any of all the designated storage locations. Since two storage locations are set on the list control UI 9002 in FIG. 9, it is determined whether the image can be stored in one of the two storage locations. Only when it is determined that the image cannot be stored in any of the storage locations, the process advances to step S12006. If, for example, three or more storage locations are set, the determination whether the image can be stored in a storage location is repeated by the number of times corresponding to the number of storage locations set.

In addition, error processing may include displaying a simple error message on the information processing apparatus 200 or the image reading apparatus 100.

The first embodiment is configured to search for a storage location in which an image can be stored in a priority order after the image is acquired. However, it is possible to acquire an image after searching for a storage location in which the image can be stored in a priority order. For example, when a user instruction to perform PullScan is input or the CPU 201 of the information processing apparatus 200 recognizes that a document has been read by PushScan, a storage destination is decided. Thereafter, a read image is acquired and stored in the decided storage destination.

When acquiring an image first, the image is stored in a USB memory even if the USB memory is inserted during document reading. This, for example, allows the user to insert a USB memory upon issuing an instruction to read a document. In addition, even if a USB memory is removed during document reading, it is possible to properly determine that the read image cannot be stored in the USB memory.

When acquiring an image after searching for a storage location, even if a USB memory is inserted during document reading, the USB memory is not connected at the time of deciding a storage location before image reading. For this reason, in this case, a USB memory is not decided as a storage destination. It is also conceivable to search for a storage location in which an image can be stored, in advance, before image reading and to search for a storage location again after a scan and store the image in the storage location.

As described above, according to the first embodiment, providing the UIs shown in FIGS. 4 and 9 to the user and making him/her operate the UIs can assign priority levels to storage locations in which the user performs an storing operation and set postprocessing with respect to storage locations at the second and subsequent highest priority levels. In addition, it is possible to select a storage location corresponding to an image reading method (PullScan or PushScan) from the set storage locations.

In the first embodiment, a portable medium such as a USB memory is set at the highest priority level, and storage locations (storage areas) capable of storing data such as the storages of information processing apparatuses are designated as storage locations at the second and subsequent highest priority levels. This makes it possible to store data in a USB memory if the USB memory is inserted and is capable of storing the data and to store data in a storage location at the second or subsequent highest priority level without causing any error after a scan if, for example, a USB memory is not inserted, no other storage locations are present, or write access is protected.

In addition, when executing PullScan of reading an image by operating the information processing apparatus 200, if it is not possible to store the image in a USB memory, a selection window for prompting to select another storage location is displayed to enable the user to select a location capable of storing data. Assume also that when executing PushScan of reading an image by operating the image reading apparatus 100, the image cannot be stored in a USB memory. In this case, even if it is difficult to make the user select, on the image reading apparatus 100, another storage location in the information processing apparatus 200, it is possible to store a storage history in the information processing apparatus 200 and browse (check) storage locations after a reading operation.

In this manner, by registering a plurality of storage locations other than a portable medium and setting a priority order, even if data cannot be stored in the portable medium, the user can store the data in another storage location. It is possible to reduce the risk of losing a storage location by setting, as postprocessing corresponding to the second or subsequent highest priority level, a processing content such as re-selecting a storage location or leaving a scan history in accordance with a usage situation.

In addition, an administrator for a routine operation can set a plurality of storage locations and record a storage history as postprocessing corresponding to the second or subsequent highest priority level in consideration of the importance or usage form of the routine operation. This setting can minimize storage errors in the routine operation. In addition, even if data cannot be stored in a storage area at the highest priority level at the time of a storing operation, leaving a storage history makes it possible to check that data is stored in another location.

<Second Embodiment>

The first embodiment is configured to make the information processing apparatus 200 display UIs for setting (changing, adding, and deleting) storage locations for images. In contrast to this, the second embodiment will exemplify an arrangement configured to make an image reading apparatus 100 display UIs for setting storage locations for images.

Figure 14:
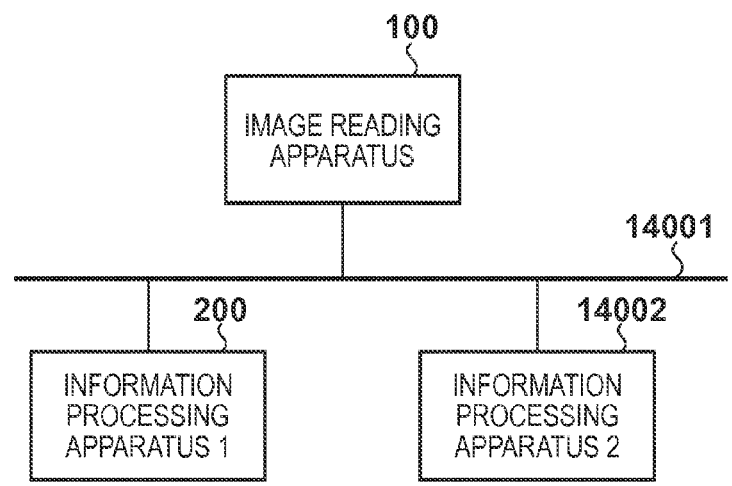
FIG. 14 is a block diagram for explaining the second embodiment.

The second embodiment is based on the assumption that a plurality of information processing apparatuses are connected to one image reading apparatus 100, as shown in FIG. 14. In this case, a plurality of information processing apparatuses including an information processing apparatus 1 (200) and an information processing apparatus 2 (14002) are connected to the image reading apparatus 100 via a network 14001. Although FIG. 14 shows the arrangement in which two information processing apparatuses are connected to the image reading apparatus 100, the number of information processing apparatuses to be connected is not specifically limited. The arrangements of the image reading apparatus 100 and information processing apparatus 200 are the same as those in the first embodiment, and hence a detailed description of them will be omitted.

Figure 15:
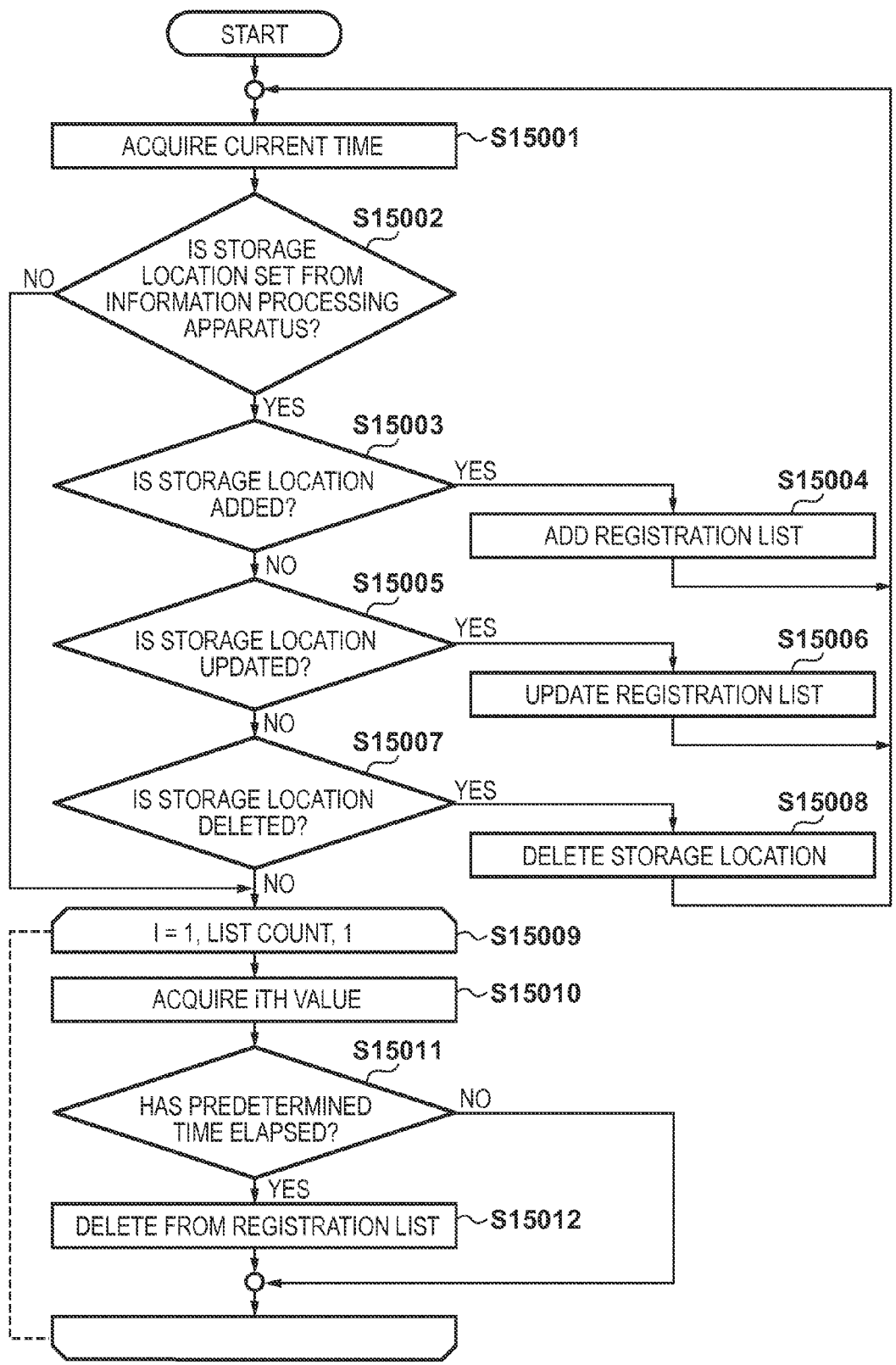
FIG. 15 is a flowchart for explaining the second embodiment.
Figures 16, 17:
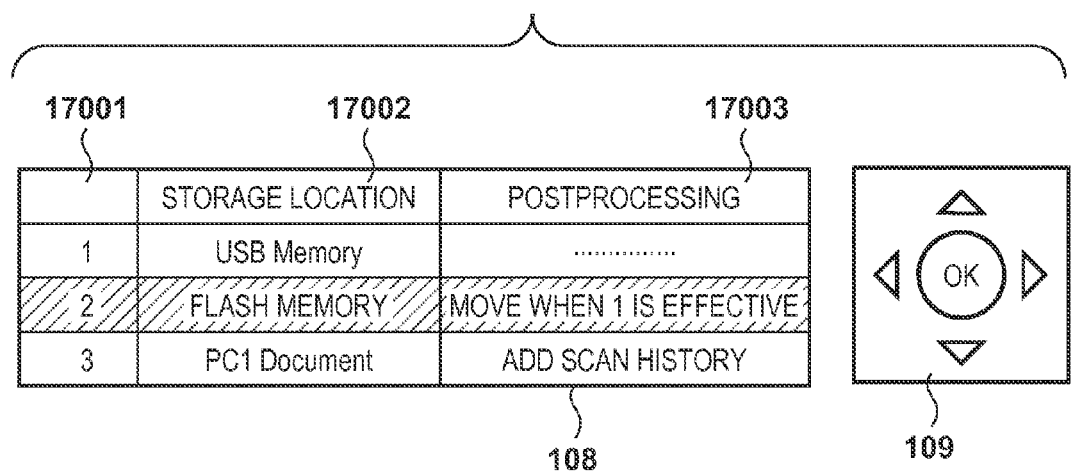
FIG. 16 is a view showing a storage location list to explain the second embodiment.
FIG. 17 is a view showing a user interface to explain the second embodiment.

FIG. 15 explains the processing of making the image reading apparatus 100 register storage locations transmitted from a plurality of information processing apparatuses in a registration list managed as data. FIG. 16 shows an example of a registration list. This registration list is stored in the flash memory 112. Referring to FIG. 16, four storage locations are registered, and the corresponding update times are stored. In addition, each information processing apparatus can add, change (update), and delete storage locations by using a UI window 4001 in FIG. 4. In this case, the information processing apparatus can transmit, to the image reading apparatus 100, storage location setting information including information indicating the storage location of a processing target and information indicating a processing instruction (to add, change (update), or delete) with respect to the storage location.

Note that the registration list shown in FIG. 16 may include both a memory incorporated in or connected to the information processing apparatus 200 and a memory incorporated in or connected to the image reading apparatus 100. That is, a priority order may be set concerning whether to store a read image in the image reading apparatus 100 or the information processing apparatus 200.

In step S15001, the image reading apparatus 100 acquires the current time from a timer held inside or an information processing apparatus and stores the current time. This current time is necessary to know an elapsed time since registration in the registration list. The current time need not be the Japan standard time or the like, and the time counted by the timer from the activation of the image reading apparatus 100 may be used. This information is not limited to the time, and the date and time including the date may be registered.

In step S15002, the image reading apparatus 100 determines whether it has received storage location setting information from an information processing apparatus. If no storage location setting information has been received (NO in step S15002), the process advances to step S15009. If storage location setting information has been received (YES in step S15002), the process advances to step S15003.

In step S15003, the image reading apparatus 100 determines whether the processing instruction corresponding to the storage location included in the received storage location setting information is "add". If the instruction is not "add" (NO in step S15003), the process advances to step S15005. If the instruction is "add" (YES in step S15003), the process advances to step S15004.

In step S15004, the image reading apparatus 100 registers, in the registration list, the storage location included in the received storage location setting information and the current time acquired in step S15001.

In step S15005, the image reading apparatus 100 determines whether the processing instruction corresponding to the storage location included in the storage location setting information is "change (update)". If the instruction is not "update" (NO in step S15005), the process advances to step S15007. If the instruction is "update" (YES in step S15005), the process advances to step S15006.

In step S15006, the image reading apparatus 100 updates the update time of the storage location in the registration list which corresponds to the storage location indicated by the received storage location setting information to the current time acquired in step S15001. In this case, if the storage location has been changed, the storage location is updated to the changed storage destination.

In step S15007, the image reading apparatus 100 determines whether the processing instruction corresponding to the storage location included in the storage location setting information is "delete". If the instruction is not "delete" (NO in step S15007), the process advances to step S15009. If the instruction is "delete" (YES in step S15007), the process advances to step S15008.

In step S15008, the image reading apparatus 100 deletes the storage location in the registration list which corresponds to the storage location indicated by the received storage location setting information.

With the above processing, a storage location can be added/updated/deleted with respect to the registration list. If, however, the image reading apparatus 100 receives storage location setting information including no processing instruction corresponding to the storage location because of a trouble in the information processing apparatus 200 (NO in step S15007) or the information processing apparatus 200 is powered off before the completion of the transmission of storage location setting information, the storage location is left in the registration list without being deleted. For this reason, in step S15009 and the subsequent steps, the image reading apparatus 100 periodically deletes, from the registration list, any storage location which is less frequently used and not updated for a predetermined time.

In step S15009, the image reading apparatus 100 repeats the loop of deleting a storage location, of the storage locations registered in the registration list, which is not updated for a predetermined time, by the number of times corresponding to the number of storage locations registered in the registration list.

In step S15010, the image reading apparatus 100 acquires the ith value (storage location/update time) in the registration list in the loop. If, for example, i is 1, the image reading apparatus 100 reads the ith storage location/update time from the registration list in FIG. 16.

In step S15011, the image reading apparatus 100 compares the current time acquired in step S15001 with the update time read in step S15010 to determine whether a predetermined time has lapsed. If the predetermined time has not elapsed (NO in step S15011), the processing is terminated. If the predetermined time has elapsed (YES in step S15011), the process advances to step S15012.

In step S15012, the image reading apparatus 100 deletes a processing target value (storage location/update time) corresponding to the elapse of the predetermined time from the registration list.

The loop starting from step S15003 finishes upon completion of the processing in steps S15004, S15005, and S15006. With this processing, a storage location/update current which is not updated for a predetermined time is deleted from the registration list.

In addition, the user may edit a registration list by operating the image reading apparatus 100 as well as making the information processing apparatus 200 edit the registration list stored in the image reading apparatus 100. A UI which is displayed on the image reading apparatus 100 to edit a registration list will be described with reference to FIG. 17.

A display portion 108 shown in FIG. 17 is a display device such as an LCD (Liquid Crystal Display) and can display graphics and characters. An operation portion 109 is a device having operation elements such as physical keys and switches arranged thereon or a device which uses a touch panel and receives inputs from the user.

The display portion 108 is used to designate a storage location for the image read by image read processing. Numbers indicating a storage order are displayed on a first column 17001. Character strings indicating storage locations are displayed on a second column 17002. Character strings indicating postprocessing are displayed on a third column 17003. The user can set (change) a storage location or postprocessing by operating an operation portion 109.

In addition, the second column 17002 can display the storage locations included in the storage location setting information received from the information processing apparatus 200 by the processing in FIG. 15. Furthermore, the second column 17002 can display external network storages connected via a memory card mount portion 103, a USB connection portion 115 to which a USB memory can be attached, and a network connection portion 111 of the image reading apparatus 100. Referring to FIG. 17, the storage location "PC1 Document" displayed on the third row indicates "Document" folder in the information processing apparatus 200 with the computer name "PC1".

Image read processing in the second embodiment will be described with reference to FIG. 18.

In step S18001, the image reading apparatus 100 reads the document placed on the document table. For example, in the case of PushScan, the document is read based on the user's operation of the operation portion 109 of the image reading apparatus 100. In the case of PullScan, a read instruction is input to the image reading apparatus 100 in accordance with a user's instruction to the information processing apparatus 200, and the image reading apparatus 100 reads the document in accordance with this read instruction. When storing a read image in the memory incorporated in or connected to the image reading apparatus 100, a reading operation is performed based on a user's operation of the operation portion 109 of the image reading apparatus 100.

Figure 19:
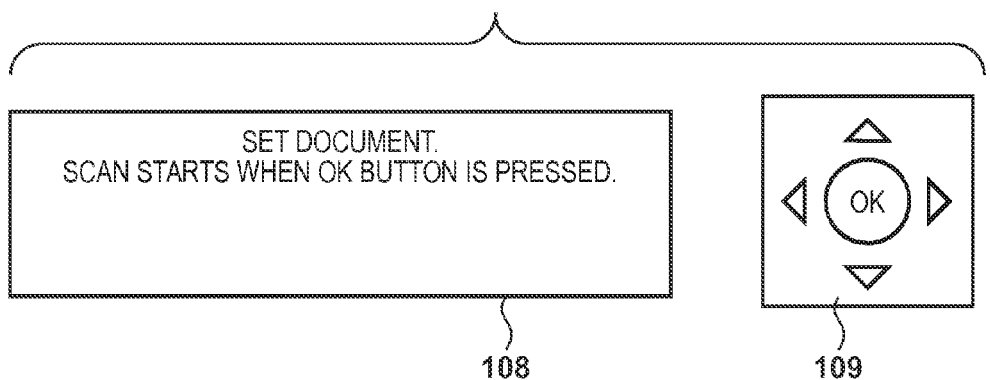
FIG. 19 is a view showing a user interface to explain the second embodiment.

At this time, a registration list indicating the priority order of storage locations has already been stored in the image reading apparatus 100. As shown in FIG. 19, therefore, since there is no need to make the user select a storage location before an image reading operation, a simple expression like that shown on the display portion 108 can be used. In addition, the user need not set and check storage locations for each scan.

In step S18002, the image reading apparatus 100 determines whether the image read in step S18001 can be stored in the storage location set on the first row displayed on the display portion 108 in FIG. 17. Referring to FIG. 17, since "USB Memory" is set as a storage location, it is determined whether a USB memory is accessibly inserted in a USB port of the image reading apparatus 100 to allow the image to be stored. Note that when the read image is to be stored in the USB memory connected to the information processing apparatus 200, the information processing apparatus 200 determines whether it is possible to store the image. In step S18002, the determination result is acquired and checked.

If the image cannot be stored (NO in step S18002), the process advances to step S18004. If the image can be stored (YES in step S18002), the process advances to step S18003.

In step S18003, the image reading apparatus 100 stores the image read in step S18001 in the USB memory connected to the image reading apparatus 100 or the information processing apparatus 200, and terminates the processing.

In step S18004, the image reading apparatus 100 determines whether the image read in step S18001 is stored in the storage location set on the second row displayed on the display portion 108 in FIG. 17. Referring to FIG. 17, "flash memory" is set as a storage location, and hence it is determined whether the image can be stored in a flash memory 112. If the image cannot be stored (NO in step S18004), the process advances to step S18008. If the image can be stored (YES in step S18004), the process advances to step S18005.

In step S18005, the image reading apparatus 100 stores the image, read in step S18001, in the flash memory 112. When a storage location is a flash memory, postprocessing is "move when 1 is effective". In this case, if a storage location (a USB memory in this case) at the highest priority level permits storage, the image is moved from the storage destination at which the image is stored in step S18005 to the storage destination at the highest priority level. For this purpose, the image reading apparatus 100 determines in step S18006 whether the image stored in the flash memory 112 can be stored in the USB memory connected to the USB connection portion 115. If the image cannot be stored (NO in step S18006), the process waits until the image can be stored. If the image can be stored (YES in step S18006), the process advances to step S18007. In step S18007, the image reading apparatus 100 moves the image stored in the flash memory 112 to the USB memory and terminates the processing.

Note that the image stored in the flash memory 112 may be deleted upon movement in step S18007 or may be copied to the USB memory while being left in the flash memory 112.

Even if the USB memory cannot be temporarily used because of the processing in steps S18005 to S18007, the image is temporarily stored in the flash memory. If the image can be stored afterward when the USB memory is inserted or the USB memory permitting storage is inserted, the image can be moved to the USB memory.

In step S18008, the image reading apparatus 100 determines whether the image read in step S18001 can be stored in the storage location set on the third row displayed on the display portion 108 in FIG. 17. Referring to FIG. 17, since "PC1 Document" is set as a storage location, the image reading apparatus 100 determines whether it is possible to access the "Document" folder in the information processing apparatus 200 and store the image in the folder. This determination may be performed by, for example, a method of determining that the image can be stored if the connection to the information processing apparatus 200 is maintained or a method of determining that the image can be stored upon inquiring of the information processing apparatus 200 whether the image can be stored.

If it is determined that the image cannot be stored (NO in step S18008), the process advances to step S18011. If the image can be stored (YES in step S18008), the process advances to step S18009.

In step S18009, the image reading apparatus 100 transmits the image read in step S18001 to application software 301 which operates in the information processing apparatus 200. With this operation, the information processing apparatus which has received this image stores the image in the "Document" folder. In step S18010, upon storing the image in the "Document" folder, the application software 301 adds the path (storage destination information) of the stored image as history information to the scan history. This scan history can be displayed on the scan history window 13001 shown in FIG. 13.

In step S18011, the image reading apparatus 100 executes error processing because the image read in step S18001 cannot be stored in any of all the designated storage locations. Since three storage locations are set on the display portion 108 in FIG. 17, it is determined whether the image can be stored in one of the three storage locations. Only when it is determined that the image cannot be stored in any of the storage locations, the process advances to step S18011. If, for example, four or more storage locations are set, the determination whether the image can be stored in a storage location is repeated by the number of times corresponding to the number of storage locations.

The second embodiment is configured to search for a storage location in which an image can be stored in a priority order after the image is read. It is, however, possible to read an image upon searching for a storage location permitting storage in the priority order. When reading an image first, the image is stored in a USB memory even if the USB memory is inserted during image reading. In contrast to this, when reading an image upon searching for a storage location, the image is stored in the storage location found before image reading, even if a USB memory is inserted during image reading. It is also conceivable to search for a storage location in which an image can be stored, in advance, before image reading and to search for a storage location again after a scan and store the image in the storage location.

As described above, according to the second embodiment, as in the first embodiment, by registering a plurality of storage locations other than a portable medium and setting a priority order, even if data cannot be stored in the portable medium, the user can store the data in another storage location. In addition, it is possible to reduce the risk of losing a storage location by setting, as postprocessing corresponding to the second or subsequent highest priority level, processing contents such as moving a storage location or leaving a scan history in accordance with a usage situation.

\<Third Embodiment\>

The first and second embodiments have exemplified the image reading apparatus having the scanner function. However, the present invention is not limited to this. For example, it is possible to use an image input apparatus such as a digital camera.

The first and second embodiments are configured to register storage locations and set postprocessing in either the information processing apparatus 200 or the image reading apparatus 100. However, the present invention is not limited to this. Such registering and setting operations may be performed in any processing apparatuses, other than the information processing apparatus 200 and the image reading apparatus 100, which are capable of implementing the functions of the respective embodiments.

In addition, various types of postprocessing have been described in the above embodiments. The user may individually set each of these types of postprocessing.

Furthermore, in the first and second embodiments, data to be stored is an image. However, the present invention is not limited to this. For example, the above embodiments may be applied to storage locations and postprocessing when data such as FAX or mail data is received (input) by the communication function of the information processing apparatus 200 or the image reading apparatus 100.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-273173, filed Dec. 27, 2013 and 2014-247317, filed Dec. 5, 2014, which are hereby incorporated by reference herein in their entirety.

What is claimed is:

1. A processing system which includes a processing apparatus and one or more image reading apparatuses, the system comprising:
   at least one processor; and
   at least one memory,
   wherein the processor executes process steps stored in the memory to perform the steps of:
   setting each of a pull priority order and a push priority order of a plurality of storage locations which are candidates for storing data obtained by reading of an original by one of the one or more image reading apparatuses, individually for each of a pull reading method and a push reading method, in accordance with an instruction which is performed from a user on a first operation device of the processing apparatus and is performed with respect to a display screen of the processing apparatus, and wherein in the pull reading method, a reading instruction is executed by the user on the first operation device, and in the push reading method, the reading instruction is executed by the user on a second operation device included in a corresponding one of the one or more image reading apparatuses;
   acquiring the data to be stored;
   specifying, in a case where the pull reading method is executed, a pull storage location of the data obtained by the pull reading method, among the plurality of storage locations, based on the pull priority order already set before acquisition of the data and to specify, in a case where the push reading method is executed, a push storage location of the data obtained by the push reading method, among the plurality of storage locations, based on the push priority order already set before acquisition of the data; and
   storing the data in the specified pull storage location or the push storage location.

2. The system according to claim 1, wherein the processing apparatus comprises the at least one processor and the at least one memory.

3. The system according to claim 1, wherein the setting sets the pull priority order or the push priority order for an internal memory of the processing apparatus or one or more image reading apparatuses and an external memory, as the plurality of storage locations.

4. A processing method in a processing system which includes a processing apparatus and one or more image reading apparatuses, the method comprising:
   a setting step of setting each of a pull priority order and a push priority order of a plurality of storage locations which are candidates for storing data obtained by reading of an original by one of the one or more image reading apparatuses, individually for each of a pull reading method and a push reading method, in accordance with an instruction from a user which is performed from a user on a first operation device of the processing apparatus and is performed with respect to a display screen of the processing apparatus, and wherein in the pull reading method, a reading instruction is executed by the user on the first operation device, and in the push reading method, the reading instruction is executed by the user on a second operation device included in a corresponding one of the one or more image reading apparatuses;
   a specification step of specifying, in a case where the pull reading method is executed, a pull storage location of the data obtained by the pull reading method, among the plurality of storage locations, based on the pull priority order already set in the setting step before acquisition of the data, and specifying, in a case where the push reading method is executed, a push storage location of the data obtained by the push reading method, among the plurality of storage locations, based on the push priority order already set in the setting step before acquisition of the data; and an execution step of storing the data in the pull storage location or the push storage location specified in the specification step.

5. The method according to claim 4, further comprising a determination step of determining whether data to be stored is able to be stored in a storage location of an external memory, depending on whether the external memory is connected to the processing apparatus, wherein the specification step specifies, in a case where the determination step determines that the data is not able to be stored in a first storage location of the external memory and is able to be stored in a second storage location of an internal memory which has a lower priority level than the first storage location in the pull priority order or the push priority order, the second storage location as the pull storage location or the push storage location.

6. The method according to claim 5, wherein, after the specification step specifies the second storage location and the execution step stores the data in the second storage location, the determination step determines whether the data is able to be stored in the first storage location of the external memory, and the execution step stores the data, stored in the second storage location, in the first storage location in a case where the determination step determines that the data is able to be stored in the first storage location.

7. The method according to claim 6, wherein the execution step executes the storage so as to delete the data from the second storage location in a case where the data is stored in the first storage location.

8. The method according to claim 6, wherein the setting step sets the pull priority order or the push priority and performs setting to execute storage of data, stored in the second storage location, into the first storage location, in accordance with an instruction by a user, and the execution step executes the storage in a case where the setting step performs the setting.

9. The method according to claim 4, wherein the setting step sets each of the pull priority order and the push priority order and further performs setting to execute window display on the display screen of the processing apparatus, to make a user select a storage location, and the execution step displays a selection window for selection of a storage location on the display screen and stores the data on a storage location selected in the selection window, in a case where the setting step performs the setting.

10. The method according to claim 9, wherein the setting step performs setting to execute the window display with respect to a storage location, and the execution step displays the selection window in a case where executing the setting with respect to a storage location.

11. The method according to claim 4, wherein the execution step executes storage of information for specifying a storage location in which data is stored, as history information, into a memory.

12. The method according to claim 11, wherein the setting step sets each of the pull priority order and the push priority order and performs setting to execute the storage, and the execution step executes the storage in a case where the setting is performed.

13. The method according to claim 4, further comprising a deletion step of deleting a storage location, of the plurality of storage locations for which each of the pull priority order and the push priority order is set by the setting step, which is not updated for a predetermined time, from storage location candidates of the data.

14. The method according to claim 5, wherein the determination step determines whether the data to be stored is able to be stored in the storage location of the external memory, depending on whether the storage location of the external memory is configured to be accessed.

15. The method according to claim 5, wherein, in a case where the external memory is connected to the processing apparatus, the determination step determines that data is configured to be stored in a case where a capacity of the data is smaller than free space of the storage location by a predetermined amount.

16. The method according to claim 5, wherein the determination step determines whether the data to be stored is able to be stored in the storage location of the external memory, further depending on whether data is configured to be stored by a generation method of the data.

17. The method according to claim 5, wherein the determination step determines whether the data to be stored is able to be stored in the storage location of the external memory, further depending on an analysis result of the data.

18. The method according to claim 5, wherein the determination step determines whether the data to be stored is able to be stored in the storage location of the external memory, further depending on the capacity of the data.

19. A non-transitory computer-readable storage medium storing a program for causing a computer to function as a processing system which includes a processing apparatus and one or more image reading apparatuses, the program comprising:

code for a setting step of setting each of a pull priority order and a push priority order of a plurality of storage locations which are candidates for storing data obtained by reading of an original by one of the one or more image reading apparatuses, individually for each of a pull reading method and a push reading method, in accordance with an instruction from a user which is performed from a user on a first operation device of the processing apparatus and is performed with respect to a display screen of the processing apparatus, and wherein in the pull reading method, a reading instruction is executed by the user on the first operation device, and in the push reading method, the reading instruction is executed by the user on a second operation device included in a corresponding one of the one or more image reading apparatuses;

code for a specification step of specifying, in a case where the pull reading method is executed, a pull storage location of the data obtained by the pull reading method, among the plurality of storage locations, based on the pull priority order already set in the setting step before acquisition of the data, and specifying, in a case where the push reading method is executed, a push storage location of the data obtained by the push reading method, among the plurality of storage locations, based on the push priority order already set in the setting step before acquisition of the data; and code for an execution step of storing the data in the pull storage location or the push storage location specified in the specification step.

20. The method according to claim 4, wherein the processing apparatus executes the setting step, the acquisition step, the specification step, and the execution step.

21. The method according to claim 4, wherein the setting step sets the pull priority order or the push priority order for an internal memory of the processing apparatus or one or more image reading apparatuses and an external memory, as the plurality of storage locations.

* * * * *